(12) United States Patent
Rotter et al.

(10) Patent No.: US 9,511,548 B1
(45) Date of Patent: *Dec. 6, 2016

(54) SYSTEMS AND METHODS FOR ASSEMBLING A SKIN OF A COMPOSITE STRUCTURE

(71) Applicant: The Boeing Company, Seal Beach, CA (US)

(72) Inventors: Daniel M. Rotter, Lake Forest Park, WA (US); Arvid J. Berg, Seattle, WA (US); Joseph D. Anderson, Seattle, WA (US); Kurtis Shuldberg Willden, Kent, WA (US); Richard V. Phillips, Enumclaw, WA (US); Stephen Lee Metschan, Black Diamond, WA (US); Brad Andrew Coxon, Everett, WA (US); Joseph J. Pruss, Redmond, WA (US)

(73) Assignee: The Boeing Company, Chicago, IL (US)

( * ) Notice: Subject to any disclaimer, the term of this patent is extended or adjusted under 35 U.S.C. 154(b) by 314 days.

This patent is subject to a terminal disclaimer.

(21) Appl. No.: 14/055,062

(22) Filed: Oct. 16, 2013

(51) Int. Cl.
*B29C 70/44* (2006.01)
*B29C 65/00* (2006.01)
(Continued)

(52) U.S. Cl.
CPC ......... *B29C 70/44* (2013.01); *B29C 66/81455* (2013.01); *B32B 37/10* (2013.01);
(Continued)

(58) Field of Classification Search
CPC ............... B29C 70/44; B29C 66/81455; B29C 66/8161; B32B 37/10; B32B 37/1018
See application file for complete search history.

(56) References Cited

U.S. PATENT DOCUMENTS 2,679,278 A 5/1954 Clark
3,614,811 A * 10/1971 Johnson ................... B30B 5/02
264/314
(Continued)

FOREIGN PATENT DOCUMENTS

DE 11019029 10/2002
EP 0163201 12/1985
(Continued)

OTHER PUBLICATIONS

U.S. Appl. No. 13/693,887, filed Dec. 4, 2012, Rotter et al.
(Continued)

*Primary Examiner* — Christopher Schatz
(74) *Attorney, Agent, or Firm* — D'Ascenzo Intellectual Property Law, P.C.

(57) ABSTRACT

Systems and methods for assembling a skin of a composite structure are disclosed herein. The methods include operatively attaching a charge of composite material to a flexible substrate to define an initial conformation for a composite-substrate assembly and locating the composite-substrate assembly and a layup mandrel proximal to one another. The methods further include pressing the composite-substrate assembly against an outer surface of the layup mandrel to deform the composite-substrate assembly to a final conformation. The methods also include affixing the charge of composite material to the outer surface of the layup mandrel and releasing the charge of composite material from the flexible substrate while retaining the charge of composite material on the outer surface of the layup mandrel. The systems include the flexible substrate, the layup mandrel, and an assembly deformation structure that is configured to press the composite-substrate assembly against the outer surface of the layup mandrel.

20 Claims, 11 Drawing Sheets

(51) Int. Cl.
*B32B 37/10* (2006.01)
*B32B 38/00* (2006.01)

(52) U.S. Cl.
CPC ....... *B29C 66/8161* (2013.01); *B32B 37/1018* (2013.01); *B32B 38/0012* (2013.01)

(56) References Cited

U.S. PATENT DOCUMENTS

| | | | |
|---|---|---|---|
| 4,066,249 A | 1/1978 | Huber et al. | |
| 5,092,954 A * | 3/1992 | Braun | B29C 31/00 |
| | | | 156/247 |
| 5,427,518 A * | 6/1995 | Morizot | B29C 31/085 |
| | | | 100/211 |
| 7,228,611 B2 | 6/2007 | Anderson et al. | |
| 7,527,222 B2 | 5/2009 | Biornstad et al. | |
| 7,624,488 B2 | 12/2009 | Lum et al. | |
| 7,879,177 B2 | 2/2011 | McCowin et al. | |
| 8,157,212 B2 | 4/2012 | Biornstad et al. | |
| 8,168,023 B2 | 5/2012 | Chapman et al. | |
| 8,182,628 B2 | 5/2012 | Biornstad et al. | |
| 9,144,959 B1 * | 9/2015 | Rotter | B29C 66/81455 |
| 2008/0105128 A1 * | 5/2008 | Yang | B25J 15/0616 |
| | | | 96/113 |
| 2010/0011580 A1 | 1/2010 | Brennan et al. | |
| 2010/0012260 A1 | 1/2010 | Brennan et al. | |
| 2014/0367037 A1 | 12/2014 | Metschan et al. | |

FOREIGN PATENT DOCUMENTS

| | | |
|---|---|---|
| FR | 895153 | 1/1945 |
| FR | 2928855 | 9/2009 |
| WO | WO 2006/043983 | 4/2006 |

OTHER PUBLICATIONS

U.S. Appl. No. 14/018,268, filed Sep. 4, 2013, Rotter et al.
Machine generated English translation of the abstract of FR 2928855, downloaded from Espacenet.com on Jul. 20, 2016.
Machine generated English translation of the abstract of DE 10119029, downloaded from Espacenet.com on Jul. 20, 2016.

* cited by examiner

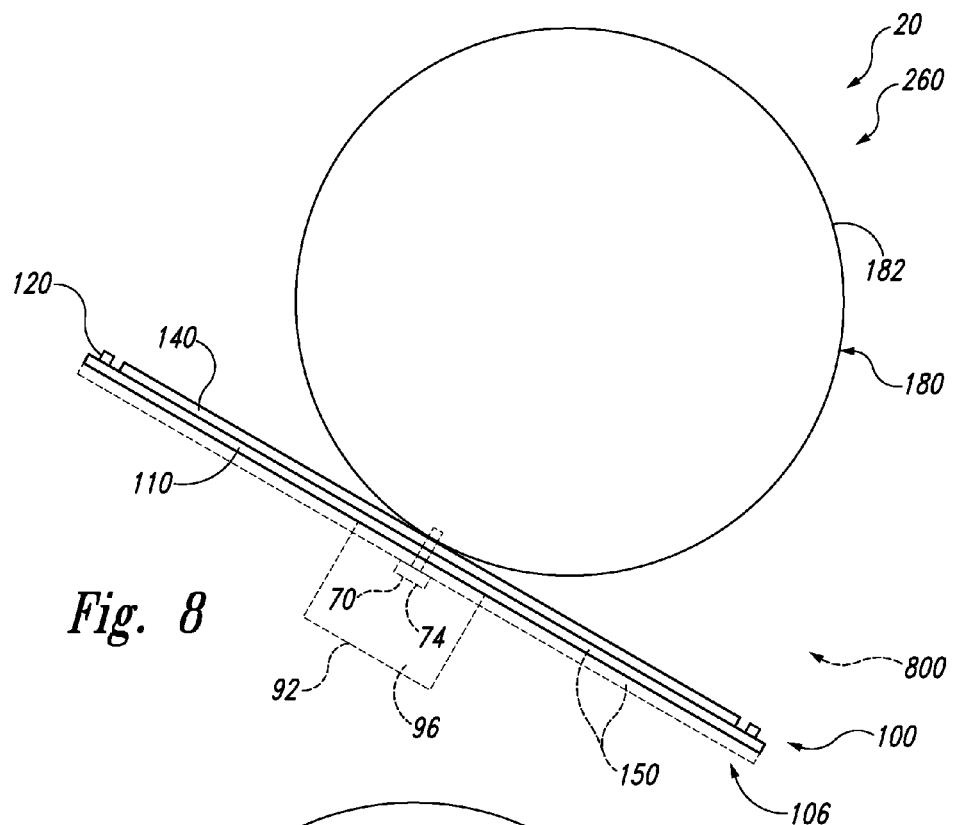
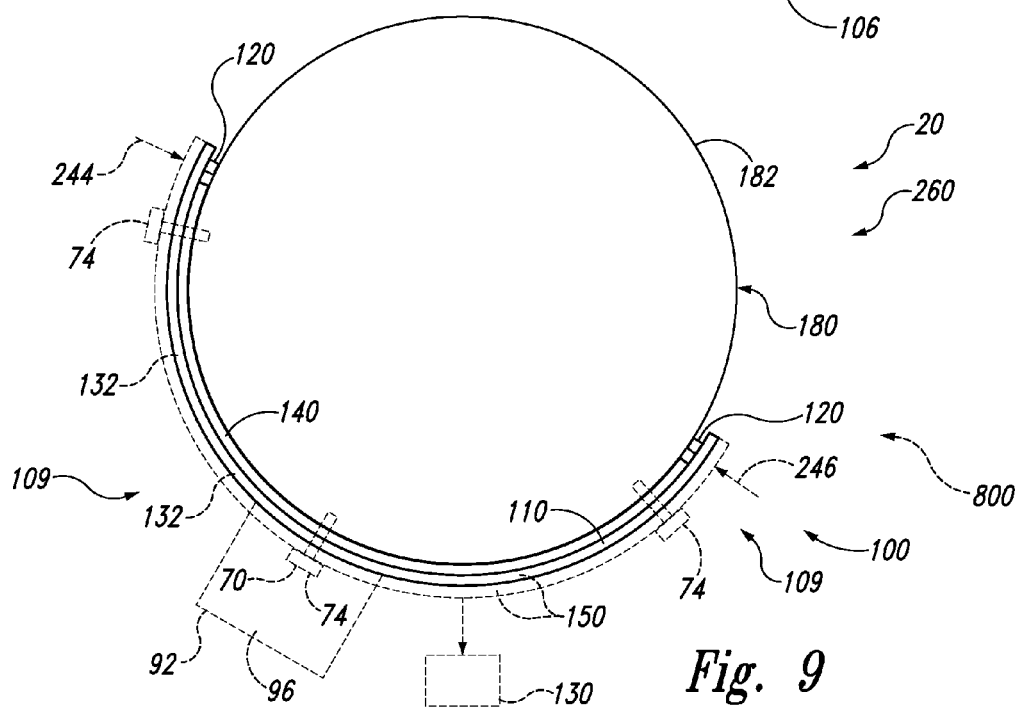

SYSTEMS AND METHODS FOR ASSEMBLING A SKIN OF A COMPOSITE STRUCTURE

FIELD

The present disclosure is directed generally to systems and methods for assembling a skin of a composite structure, and more particularly to systems and methods that utilize a flexible substrate to support a charge of composite material that forms a portion of the skin of the composite structure.

BACKGROUND

Historically, construction and/or assembly of a composite structure on a layup mandrel is a serial process that involves sequentially forming a plurality of support structures, such as stringers and/or spacers, on an outer surface of the layup mandrel, followed by locating a continuous, or at least substantially continuous, length of composite fibers around the outer surface of the layup mandrel to form a skin of the composite structure. This locating may be accomplished by wrapping the length of composite fibers around the outer surface of the layup mandrel, such as by rotating the layup mandrel with respect to a layup head that dispenses the length of composite fibers and/or by rotating the layup head relative to the layup mandrel.

Generally, the support structures are formed from a plurality of plies, or layers, of a composite material, such as a pre-preg material, and each layer may be applied individually and/or sequentially to the outer surface of the layup mandrel. Similarly, the skin typically includes a plurality of layers, with each layer being applied individually and/or sequentially to the outer surface of the layup mandrel.

As composite structures become larger and/or more complex, such as may be the case for composite barrel assemblies for an airplane fuselage, the time required to perform the above-described serial processes becomes significant. In addition, a cost of layup mandrels for large and/or complex composite structures is substantial. Thus, there exists a need for improved systems and methods for assembling a skin of a composite structure.

SUMMARY

Systems and methods for assembling a skin of a composite structure are disclosed herein. The systems include the flexible substrate, the layup mandrel, and an assembly deformation structure that is configured to press the composite-substrate assembly against the outer surface of the layup mandrel.

The methods include operatively attaching a charge of composite material to a flexible substrate to define an initial conformation for a composite-substrate assembly and locating the composite-substrate assembly and a layup mandrel proximal to one another. The methods further include pressing the composite-substrate assembly against an outer surface of the layup mandrel to deform the composite-substrate assembly to a final conformation. The methods also include affixing the charge of composite material to the outer surface of the layup mandrel and releasing the charge of composite material from the flexible substrate while retaining the charge of composite material on the outer surface of the layup mandrel.

In some embodiments, the operatively attaching may include applying a retention vacuum between the charge of composite material and the flexible substrate. In some embodiments, the methods further may include maintaining the retention vacuum during the pressing. In some embodiments, the methods also may include regulating a magnitude of the retention vacuum during the pressing.

In some embodiments, the pressing may include applying a first deformation force to the flexible substrate and applying a second deformation force to the charge of composite material. In some embodiments, the first deformation force may be directed toward the outer surface of the layup mandrel and may be applied by an assembly deformation structure that is separate from the layup mandrel. In some embodiments, the second deformation force may be directed away from the outer surface of the layup mandrel and may be applied by the outer surface of the layup mandrel.

In some embodiments, the pressing further may include conforming the composite-substrate assembly to the outer surface of the layup mandrel and/or to a contour of the outer surface of the layup mandrel. In some embodiments, the pressing may include extending a piston to both press the composite-substrate assembly against the outer surface of the layup mandrel and align the charge of composite material with the outer surface of the layup mandrel.

In some embodiments, the pressing may include drawing the composite-substrate assembly toward the outer surface of the layup mandrel with a tether. In some embodiments, the pressing may include utilizing a gravitational force to press the charge of composite material against the outer surface of the layup mandrel and/or to deform the composite-substrate assembly to the final conformation. In some embodiments, the pressing may include applying a deformation force to an edge of the composite-substrate assembly to urge the composite-substrate assembly toward the outer surface of the layup mandrel.

In some embodiments, the methods further may include supporting a first portion of the composite-substrate assembly with a first support surface and supporting a second portion of the composite-substrate assembly with a second support surface that is spaced apart from the first support surface to define a longitudinal opening therebetween. In some embodiments, the locating may include contacting the outer surface of the layup mandrel with a portion of the composite-substrate assembly that extends across the longitudinal opening, and the pressing may include moving the layup mandrel, the first support surface, and/or the second support surface relative to one another such that the layup mandrel moves into, or is located within, the longitudinal opening.

In some embodiments, the pressing may include moving the layup mandrel, the first support surface, and/or the second support surface relative to one another such that the layup mandrel contacts the charge of composite material and urges the charge of composite material into, or through, the longitudinal opening. In some embodiments, the pressing further may include moving the first support surface and the second support surface away from one another to increase a width of the longitudinal opening.

In some embodiments, the releasing may include ceasing application of the retention vacuum between the charge of composite material and the flexible substrate. In some embodiments, the methods further may include compacting the charge of composite material on the outer surface of the layup mandrel. In some embodiments, the compacting may include applying a compaction vacuum between the flexible substrate and the outer surface of the layup mandrel with a compaction vacuum manifold that is defined by the flexible substrate.

In some embodiments, the methods further may include repeating at least a portion of the methods. In some embodiments, the repeating may include repeating the operatively attaching a plurality of times to generate a plurality of composite-substrate assemblies that include a respective plurality of charges of composite material and a respective plurality of flexible substrates. In some embodiments, the repeating further may include repeating the locating, the pressing, the affixing, and the releasing a plurality of times with the plurality of composite-substrate assemblies to retain the respective plurality of charges of composite material on the outer surface of the layup mandrel.

BRIEF DESCRIPTION OF THE DRAWINGS

FIG. 8 is a schematic representation of a second process flow according to the present disclosure for assembling a composite structure.

FIG. 9 is another schematic representation of the second process flow according to the present disclosure for assembling a composite structure.

DESCRIPTION

Figure 1:
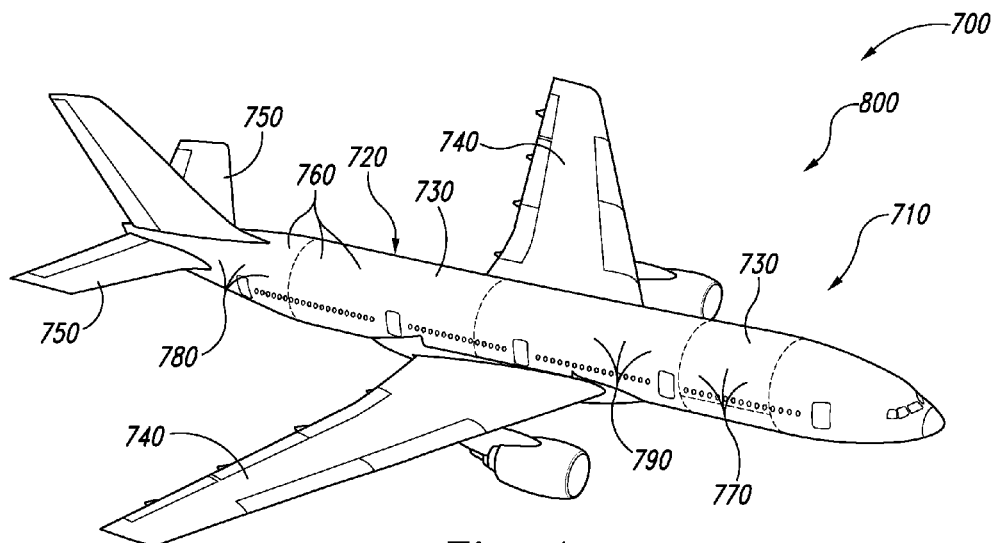
FIG. 1 is an illustrative, non-exclusive example of an aircraft that includes a composite structure that may be formed using the systems and methods according to the present disclosure.

FIGS. 1-44 provide illustrative, non-exclusive examples of composite structures 800, composite structure manufacturing apparatus 20, and/or components thereof according to the present disclosure. Elements that serve a similar, or at least substantially similar, purpose are labeled with like numbers in each of FIGS. 1-14, and these elements may not be discussed in detail herein with reference to each of FIGS. 1-14. Similarly, all elements may not be labeled in each of FIGS. 1-14, but reference numerals associated therewith may be utilized herein for consistency. Elements, components, and/or features that are discussed herein with reference to one or more of FIGS. 1-14 may be included in and/or utilized with any of FIGS. 1-14 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

Figure 2:
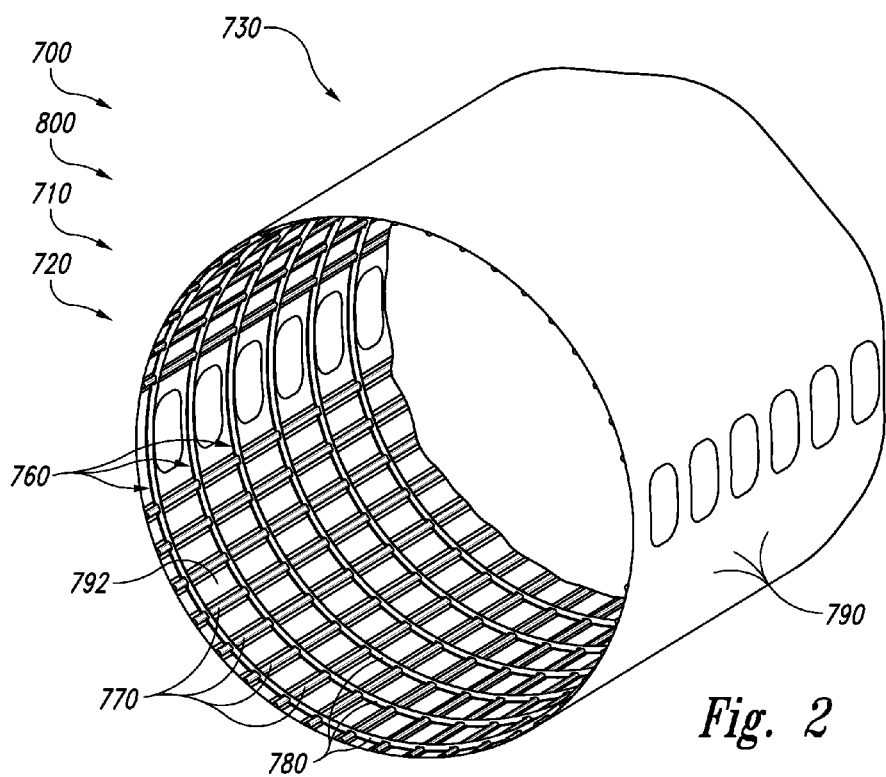
FIG. 2 is an illustrative, non-exclusive example of a fuselage barrel that includes a composite structure that may be formed using the systems and methods according to the present disclosure.

FIG. 1 is an illustrative, non-exclusive example of an aircraft 700 that includes a composite structure 800 that may be formed using the systems and methods according to the present disclosure, and FIG. 2 is an illustrative, non-exclusive example of a fuselage barrel 730 that may form a portion of aircraft 700 and includes composite structure 800. Aircraft 700 and/or composite structure 800 thereof may include a plurality of skin segments 790 that may form, cover, and/or be an outer surface of any suitable portion of aircraft 700 and that also may be referred to herein as a non-planar skin 790. As illustrated most clearly in FIG. 2, aircraft 700 also may include a plurality of stringers 770 that, together with a plurality of frames 780, may support an inner surface 792 of skin segments 790. A plurality of fillers 760 may extend between frames 780 and inner surface 792 and may form a portion of composite structure 800.

It is within the scope of the present disclosure that any suitable portion of aircraft 700 may be formed from and/or be composite structure 800. As illustrative, non-exclusive examples, composite structure 800 may form, or form a portion of, an airframe 710, a fuselage 720, a fuselage barrel 730, a wing 740, and/or a stabilizer 750 of aircraft 700.

Figure 3:
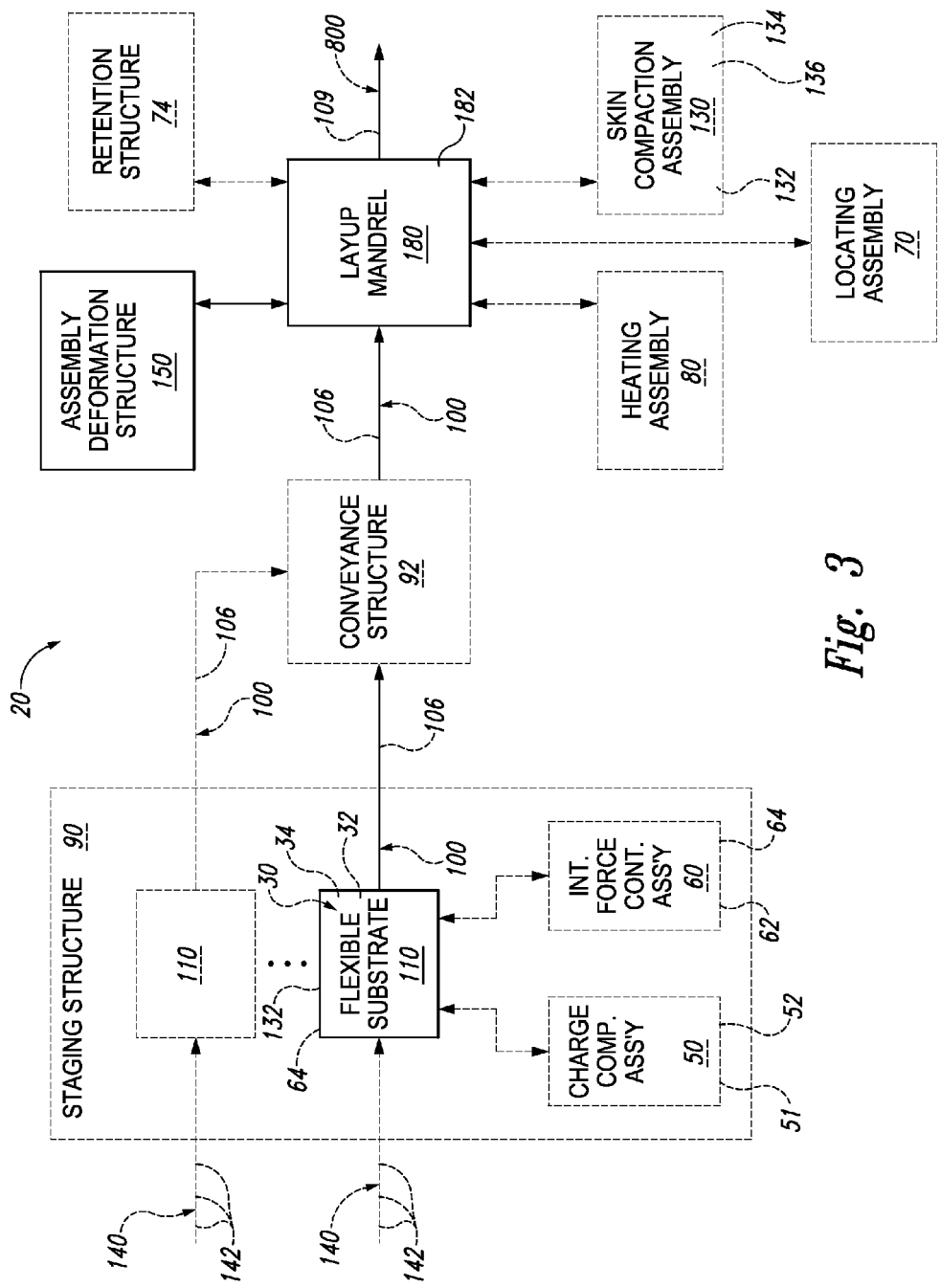
FIG. 3 is a schematic block diagram of a composite structure manufacturing apparatus according to the present disclosure.

FIG. 3 is a schematic block diagram of a composite structure manufacturing apparatus 20 according to the present disclosure. Composite structure manufacturing apparatus 20 is configured to operatively attach a flexible substrate 110 and a charge of composite material 140 to form a composite-substrate assembly 100 in an initial conformation 106. This may include attaching a single charge of composite material 140 to a single flexible substrate 110 to form a single composite-substrate assembly 100, sequentially attaching a plurality of charges of composite material 140 to a single flexible substrate 110 to sequentially form a plurality of composite-substrate assemblies 100 that utilize the same flexible substrate 110, and/or attaching a plurality of charges of composite material 140 to a plurality of flexible substrates 110 to form a plurality of distinct composite-substrate assemblies 100. When apparatus 20 forms the plurality of distinct composite-substrates assemblies 100, apparatus 20 further may include a staging structure 90, which may be configured to store, house, and/or otherwise contain the plurality of distinct composite-substrate assemblies 100.

Composite-substrate assembly 100 then may be located near and/or proximal to a layup mandrel 180 that defines an outer surface 182, such as via a conveyance structure 92. Outer surface 182 may be configured to receive charge of composite material 140 and/or may define a surface contour that corresponds to a desired shape for charge of composite material 140. An assembly deformation structure 150 then may operate in cooperation with layup mandrel 180 to press composite-substrate assembly 100 against outer surface 182, such as to deform composite-substrate assembly 100 from initial conformation 106 to a final conformation 109 that is different from initial conformation 106 and/or to conform composite-substrate assembly 100 to outer surface 182, and/or to the surface contour thereof, to produce at least a portion of a composite structure 800. Additional illustrative, non-exclusive examples of composite structure manufacturing apparatus 20, which also may be referred to herein as composite structure fabrication assembly 20 and/or as apparatus 20, are disclosed in U.S. patent application Ser. No. 13/886,976, which is entitled SYSTEMS AND METHODS OF FORMING A SKIN FOR A COMPOSITE STRUCTURE AND COMPOSITE STRUCTURES INCLUDING THE SAME, was filed on May 3, 2013, and the complete disclosure of which is hereby incorporated by reference.

As illustrated in dashed lines in FIG. 3, composite structure manufacturing apparatus 20 further may include a layup surface 30 that is configured to receive and/or support flexible substrate 110 and/or charge of composite material 140 while flexible substrate 110 is being operatively attached to charge of composite material 140 (and/or while charge of composite material 140 is being operatively attached to flexible substrate 110). Layup surface 30 may be a planar layup surface 32 and/or a non-planar layup surface 34.

A charge compaction assembly 50 may be utilized to compact charge of composite material 140 on flexible substrate 110. This may decrease a volume of charge of composite material 140, increase an adhesive force between charge of composite material 140 and flexible substrate 110, and/or increase an adhesive force among a plurality of plies 142 of composite material that comprise charge of composite material 140. Additionally or alternatively, an interfacial force control assembly 60 may be utilized to control an interfacial force that is present between charge of composite material 140 and flexible substrate 110.

As also illustrated in dashed lines in FIG. 3, composite structure manufacturing apparatus 20 further may include a locating assembly 70 that is configured to locate and/or orient composite-substrate assembly 100 relative to layup mandrel 180 to define a target (or desired) orientation (or relative orientation) therebetween. Composite structure manufacturing apparatus 20 also may include a retention structure 74 that is configured to (temporarily) retain composite-substrate assembly 100 on layup mandrel 180.

In addition, composite structure manufacturing apparatus 20 also may include a heating assembly 80 that is configured to heat one or more components of composite structure manufacturing apparatus 20 and/or of composite-substrate assembly 100. Additionally or alternatively, composite structure manufacturing apparatus 20 also may include a skin compaction assembly 130 that is configured to compact charge of composite material 140 on outer surface 182 of layup mandrel 180.

Assembly deformation structure 150 may include any suitable structure that is configured to press composite-substrate assembly 100 against outer surface 182 of layup mandrel 180 and/or that is configured to conform at least a portion of composite-substrate assembly 100 to the surface contour of layup mandrel 180. As an illustrative, non-exclusive example, assembly deformation structure 150 may be configured to deform composite-substrate assembly 100 such that the composite-substrate assembly defines (or has) a concave side and an opposed convex side. Under these conditions, charge of composite material 140 may be located on the concave side of composite-substrate assembly 100. Additionally or alternatively, flexible substrate 110 may be located on the convex side of the composite-substrate assembly. More specific but still illustrative, non-exclusive examples of assembly deformation structures 150 are discussed in more detail herein with reference to FIGS. 6-12.

Interfacial force control assembly 60 may include any suitable structure that is configured to regulate the interfacial force that is applied (or present) between charge of composite material 140 and flexible substrate 110. This may include regulating to retain charge of composite material 140 on flexible substrate 110 and/or to control relative motion and/or slippage between charge of composite material 140 and flexible substrate 110, such as during deformation from initial conformation 106 to final conformation 109.

As an illustrative, non-exclusive example, interfacial force control assembly 60 may include and/or be a retention vacuum assembly 62 that is configured to apply a retention vacuum between charge of composite material 140 and flexible substrate 110. As another illustrative, non-exclusive example, retention vacuum assembly 62 may include and/or be a retention vacuum manifold 64 that may be defined, at least in part, by flexible substrate 110, as discussed in more detail herein.

Locating assembly 70 may include any suitable structure that is configured to align composite-substrate assembly 100 with layup mandrel 180. As an illustrative, non-exclusive example, locating assembly 70 may include and/or be an alignment pin that extends through flexible substrate 110 and into an alignment pin receptacle that may be defined within and/or by layup mandrel 180. As another illustrative, non-exclusive example, locating assembly 70 also may include and/or be a piston that extends through flexible substrate 110 and into an indexing recess that is defined by layup mandrel 180. Under these conditions, the piston also may press composite-substrate assembly 100 against outer surface 182 and thus may function as and/or form a part of assembly deformation structure 150.

Similarly, retention structure 74 may include any suitable structure that is configured to retain composite-substrate assembly 100 on outer surface 182 of layup mandrel 180. As an illustrative, non-exclusive example, retention structure 74 may include and/or be a retention pin that extends through flexible substrate 110 and into a respective retention pin receptacle that may be defined within and/or by layup mandrel 180.

Heating assembly 80 may include any suitable structure that is configured to heat at least a portion of composite structure manufacturing apparatus 20 and/or composite-substrate assembly 100. As an illustrative, non-exclusive example, heating assembly 80 may be configured to heat composite-substrate assembly 100, flexible substrate 110, and/or charge of composite material 140 to permit, facilitate, and/or increase a rate of deformation of the composite-substrate assembly while transitioning from initial conformation 106 to final conformation 109. Illustrative, non-exclusive examples, of heating assembly 80 include a heat blanket, a heat lamp, an electric heater, a resistive heater, a combustion heater, a conductive heater, a convective heater, and/or a radiative heater.

Charge compaction assembly 50 may include any suitable structure that is configured to compact charge of composite material 140 on (or onto) flexible substrate 110. As an illustrative, non-exclusive example, charge compaction assembly 50 may include and/or be a vacuum bag 51. As another illustrative, non-exclusive example, charge compaction assembly 50 also may include and/or be a vacuum chuck 52. Illustrative, non-exclusive examples of vacuum chucks are disclosed in U.S. patent application Ser. No. 13/887,006, which is entitled FLEXIBLE MATERIAL TRANSFER DEVICES, FLEXIBLE VACUUM COMPACTION DEVICES, FLEXIBLE VACUUM CHUCKS, AND SYSTEMS AND METHODS INCLUDING THE SAME, was filed on May 3, 2013, and the complete disclosure of which is hereby incorporated by reference.

Skin compaction assembly 130 may include any suitable structure that is configured to compact charge of composite material 140 on outer surface 182 of layup mandrel 180. As an illustrative, non-exclusive example, skin compaction assembly 130 may be configured to apply a compaction vacuum between flexible substrate 110 and outer surface 182 of layup mandrel 180 to compact charge of composite material 140 therebetween. As another illustrative, non-exclusive example, skin compaction assembly 130 may include a compaction vacuum manifold 132 that may be (at least partially) defined by flexible substrate 110 and that is configured to provide the compaction vacuum. As yet another illustrative, non-exclusive example, skin compaction assembly 130 further may include a compaction vacuum source 134 that is in fluid communication with the compaction vacuum manifold and/or that is configured to generate the compaction vacuum. As a more specific but still illustrative, non-exclusive example, skin compaction assembly 130 may include and/or be a vacuum chuck 136, illustrative, non-exclusive examples of which are disclosed in U.S. patent application Ser. No. 13/887,006, which is incorporated herein.

Layup mandrel 180 may include any suitable structure that has and/or defines outer surface 182 that is configured to receive charge of composite material 140. As illustrative, non-exclusive examples, layup mandrel 180 may include and/or be an outer mold line layup mandrel and/or an inner mold line layup mandrel. As additional illustrative, non-exclusive examples, layup mandrel 180 may define a contour of a surface, an inner surface, and/or an outer surface of at least one of an aircraft, a portion of an aircraft, an airframe, a portion of an airframe, a fuselage, a portion of a fuselage, a fuselage barrel, a portion of a fuselage barrel, a wing, a portion of a wing, an elevator, a portion of an elevator, a rudder, a portion of a rudder, a flap, a portion of a flap, an engine nacelle, a portion of an engine nacelle, an engine cowl, a portion of an engine cowl, a stabilizer, and/or a portion of a stabilizer.

It is within the scope of the present disclosure that outer surface 182 may be defined by, or directly defined by, a body that comprises layup mandrel 180. Additionally or alternatively, it is also within the scope of the present disclosure that outer surface 182 may be defined by an intermediate structure that is located between charge of composite material 140 and layup mandrel 180 when charge of composite material 140 is operatively located on layup mandrel 180.

Initial conformation 106 may define any suitable conformation, shape, contour, and/or surface profile. As an illustrative, non-exclusive example, initial conformation 106 may include and/or be a planar, or at least substantially planar, conformation. As additional illustrative, non-exclusive examples, initial conformation 106 may include and/or be a non-planar conformation and/or an arcuate conformation.

In addition, final conformation 109 may include and/or be a non-planar and/or an arcuate conformation. As an illustrative, non-exclusive example, final conformation 109 may correspond to a surface profile, or contour, of outer surface 182 of layup mandrel 180. As discussed, initial conformation 106 is different from final conformation 109. As an illustrative, non-exclusive example, a radius of curvature that is defined by final conformation 109 may be less than a radius of curvature that is defined by initial conformation 106.

Figure 4:
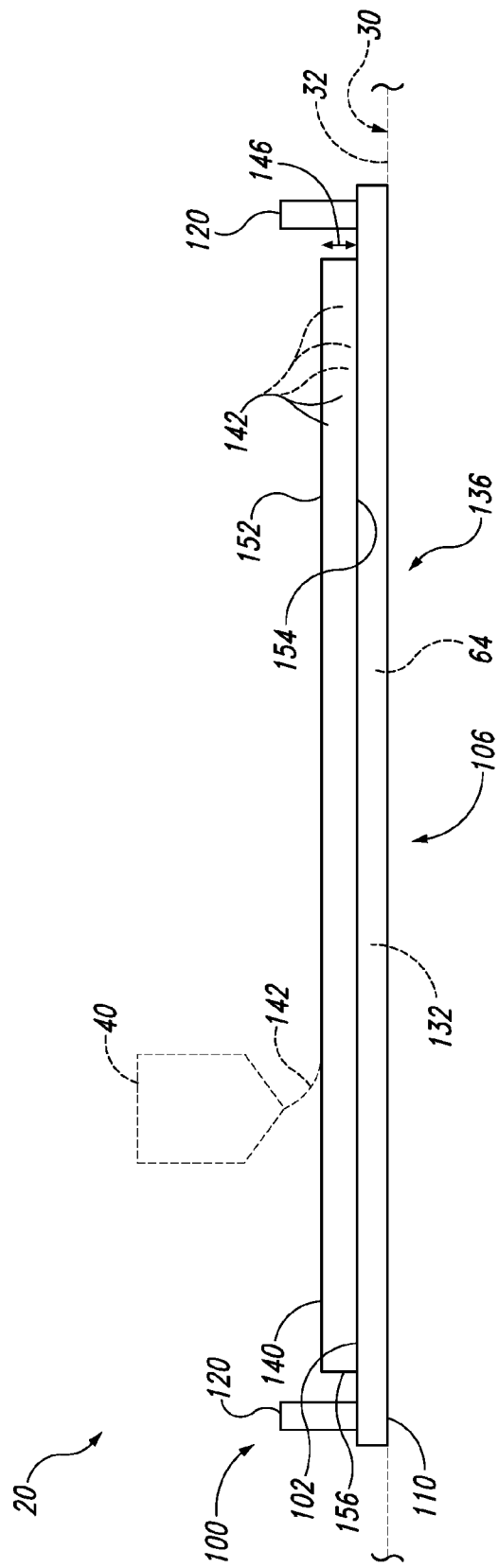
FIG. 4 is a schematic cross-sectional view of illustrative, non-exclusive examples of a composite-substrate assembly that may be included in and/or utilized with a composite structure manufacturing apparatus according to the present disclosure.
Figure 5:
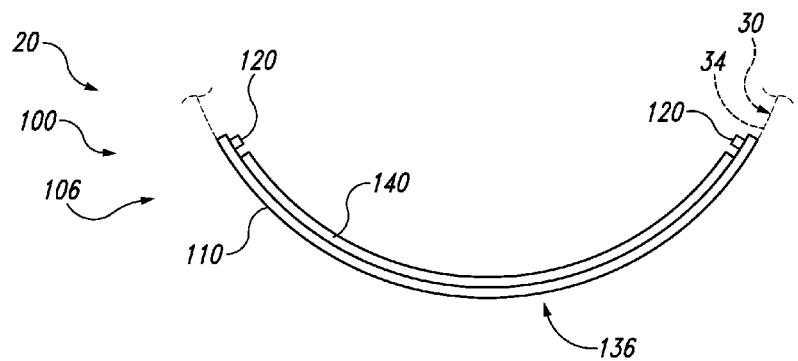
FIG. 5 is another schematic cross-sectional view of illustrative, non-exclusive examples of a composite-substrate assembly that may be included in and/or utilized with a composite structure manufacturing apparatus according to the present disclosure.

FIGS. 4-5 are schematic cross-sectional views of illustrative, non-exclusive examples of composite-substrate assemblies 100 that may be included in and/or utilized with composite structure manufacturing apparatus 20 according to the present disclosure. FIG. 4 illustrates composite-substrate assembly 100 in a planar, or at least substantially planar, initial conformation 106, such as might be obtained if composite-substrate assembly 100 is formed on a planar 32 layup surface 30. In contrast, FIG. 5 illustrates composite-substrate assembly 100 in an arcuate, curvilinear, and/or otherwise non-planar initial conformation 106, such as might be obtained if composite-substrate assembly 100 is formed on a non-planar 34 layup surface 30 (as illustrated in FIG. 3).

Figure 7:
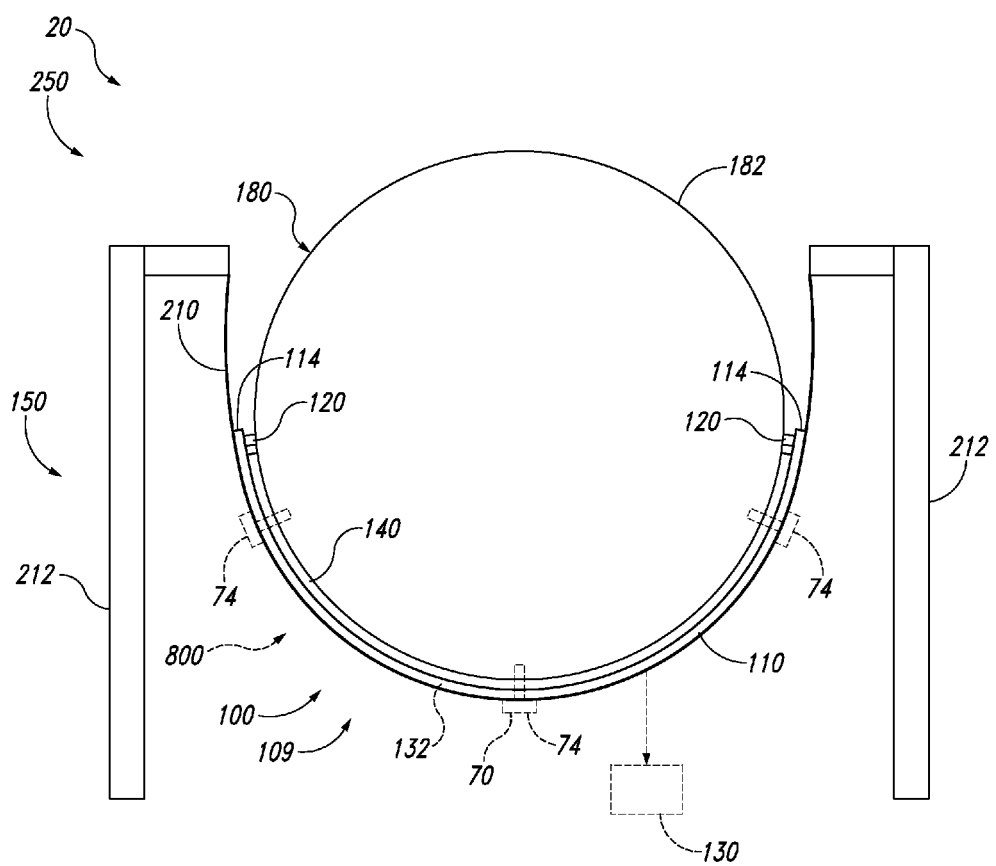
FIG. 7 is another schematic representation of the first process flow according to the present disclosure for assembling a composite structure.
Figure 12:
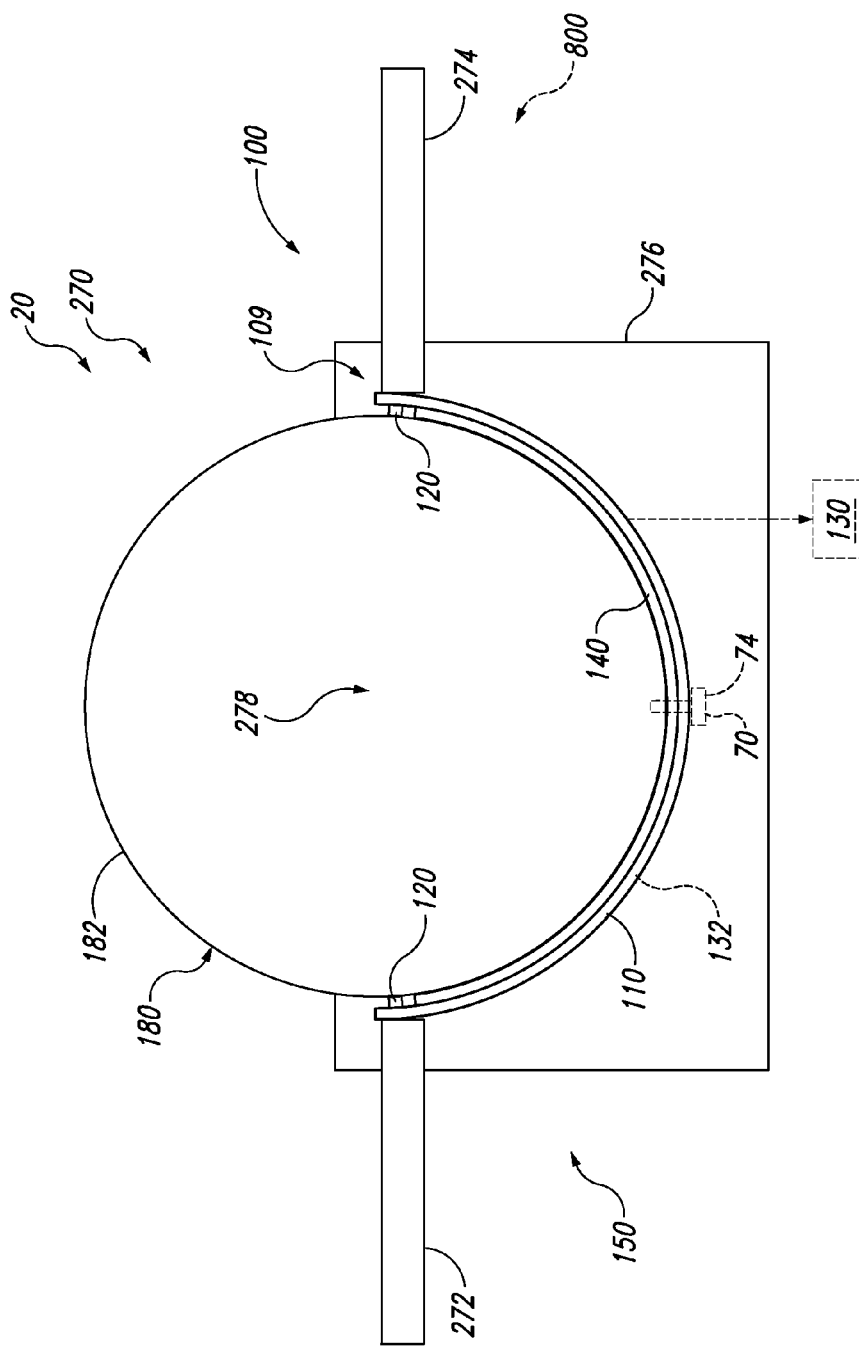
FIG. 12 is another schematic representation of the third process flow according to the present disclosure for assembling a composite structure.

In FIGS. 4-5, composite-substrate assembly 100 includes a flexible substrate 110 and a charge of composite material 140 that is operatively attached to the flexible substrate. As discussed, composite-substrate assembly 100 may include and/or be a vacuum chuck 136 that further includes a sealing structure 120 that is configured to form a fluid seal with outer surface 182 of layup mandrel 180 (as illustrated in FIGS. 7, 9, and 12). Additional illustrative, non-exclusive examples of composite-substrate assemblies 100 are disclosed in U.S. patent application Ser. No. 13/693,887, which is entitled SYSTEMS AND METHODS FOR ASSEMBLING A SKIN OF A COMPOSITE STRUCTURE, was filed on Dec. 4, 2012, and the complete disclosure of which is hereby incorporated by reference.

As perhaps illustrated most clearly in FIG. 4, charge of composite material 140 is operatively attached to flexible substrate 110 to define an interface 102 therebetween. It is within the scope of the present disclosure that charge of composite material 140 may be operatively attached to flexible substrate 110 in any suitable manner. As an illustrative, non-exclusive example, charge of composite material 140 may be manually located on, manually placed in contact with, and/or manually adhered to flexible substrate 110. As another illustrative, non-exclusive example, and as illustrated in dashed lines in FIG. 4, a layup device 40 may be utilized to locate and/or place a plurality of plies 142 of composite material on flexible substrate 110 to form and/or define charge of composite material 140.

Charge of composite material 140 may include any suitable structure that is defined by a plurality of stacked plies 142 of composite material. Stacked plies 142 also may be referred to herein as composite plies 142, stacked composite plies 142, layered composite plies 142, plies 142, layers 142, and/or layered composite tape 142. Charge of composite material 140 also may be referred to herein as charge 140, composite charge 140, stack 140 of composite material, and/or stack 140 of composite plies. Charge 140 may include any suitable number of stacked plies 142. As illustrative, non-exclusive examples, charge 140 may include at least 2, at least 3, at least 4, at least 6, at least 10, at least 15, at least 20, at least 30, at least 40, at least 50, or at least 60 stacked plies 142. Additionally or alternatively, charge 140 also may include fewer than 100, fewer than 90, fewer than 80, fewer than 70, fewer than 60, fewer than 50, or fewer than 40 stacked plies 142. Additionally or alternatively, charge 140 also may include one or more regions that include a different number of stacked plies 142 than one or more other regions thereof.

It is within the scope of the present disclosure that composite structure manufacturing apparatus 20 and/or charge 140 may be configured to permit and/or facilitate relative motion, or slipping, of one or more plies 142 within charge 140 relative to one or more other plies 142 during deformation of charge 140, such as when composite-substrate assembly 100 is pressed against outer surface 182 of layup mandrel 180, as illustrated in FIGS. 6-12. As an illustrative, non-exclusive example, plies 142 may be cut and/or segmented to permit and/or facilitate this relative motion. As another illustrative, non-exclusive example, plies 142 may be oriented relative to one another to permit and/or facilitate this relative motion. As yet another illustrative, non-exclusive example, composite structure manufacturing apparatus 20 may include interfacial force control assembly 60 (as illustrated in FIG. 3).

Charge 140 may be a planar, or at least substantially planar, charge of composite material 140. As an illustrative, non-exclusive example, and as illustrated in FIG. 4, charge 140 may define two opposed sides 152 and 154, which also may be referred to herein as first side 152 and second side 154, that may be separated by the thickness 146 of the charge of composite material. As illustrated, first side 152 may form an exposed surface of composite-substrate assembly 100, while second side 154 may define a portion of interface 102. In addition, opposed sides 152 and 154, together with one or more edges 156, may define a surface area of charge 140, and it is within the scope of the present disclosure that opposed sides 152 and 154 may define at least a threshold fraction of the surface area of charge 140. As illustrative, non-exclusive examples, the threshold fraction of the surface area may be at least 50%, at least 60%, at least 70%, at least 75%, at least 80%, at least 85%, at least 90%, at least 95%, or at least 99% of the surface area of charge 140.

In addition, first side 152 and/or second side 154 may define any suitable area, or surface area. As illustrative, non-exclusive examples, the surface area may be at least 1 square meter, at least 2 square meters, at least 3 square meters, at least 4 square meters, at least 6 square meters, at least 8 square meters, at least 10 square meters, at least 12 square meters, at least 15 square meters, or at least 20 square meters.

Charge of composite material 140 may be formed and/or defined from any suitable composite material. As an illustrative, non-exclusive example, charge 140 may include and/or be a plurality of fibers, a cloth, a plurality of fibers embedded in a resin material, and/or a cloth that is embedded in a resin material. Illustrative, non-exclusive examples of the plurality of fibers include a plurality of carbon fibers, a plurality of polymeric fibers, and/or a plurality of glass fibers. Illustrative, non-exclusive examples of the cloth include a cloth that is formed from the plurality of fibers. Illustrative, non-exclusive examples of the resin material include an epoxy, an adhesive, and/or a polymeric resin. As more specific but still illustrative, non-exclusive examples, charge 140 may include and/or be a pre-impregnated composite material and/or a pre-impregnated composite tape. As another illustrative, non-exclusive example, charge 140 also may include and/or be a viscoelastic material.

Flexible substrate 110 may include any suitable structure that may be selected and/or configured to support and/or be operatively attached to charge 140 to form, or define, composite-substrate assembly 100. In addition and as discussed herein, flexible substrate 110 is flexible and thereby permits deformation of composite-substrate assembly 100 when composite-substrate assembly 100 is pressed against outer surface 182 of layup mandrel 180, as illustrated in FIGS. 6-12.

As illustrative, non-exclusive examples, flexible substrate 110 may include and/or be formed from a polymeric material, a plastic, a polycarbonate, a polyester, a metal, and/or aluminum. It is within the scope of the present disclosure that flexible substrate 110 may define a continuous and/or monolithic structure that may be solid and/or void-free. Additionally or alternatively, it is also within the scope of the present disclosure that flexible substrate 110 may define one or more voids therein and/or may define a panel and/or a double-walled panel that may define at least a portion of compaction vacuum manifold 132, as discussed in more detail herein with reference to FIG. 14.

As another illustrative, non-exclusive example, flexible substrate 110 also may be referred to herein as and/or may be a sheet 110, a flexible sheet 110, a planar sheet 110, a planar substrate 110, and/or an at least substantially planar substrate 110. Additionally or alternatively, and similar to charge 140, flexible substrate 110 may define two opposed substrate sides and at least one substrate edge, and the two opposed substrate sides may define at least a threshold fraction of a total surface area of flexible substrate 110. Illustrative, non-exclusive examples of the threshold fraction of the total surface area of flexible substrate 110 may be at least 50%, at least 60%, at least 70%, at least 75%, at least 80%, at least 85%, at least 90%, at least 95%, or at least 99% of the total surface area of flexible substrate 110.

Sealing structure 120 may include any suitable structure that is configured to form the fluid seal between outer surface 182 of layup mandrel 180 and flexible substrate 110 when composite-substrate assembly 100 is operatively located on outer surface 182 and sealing structure 120 is compressed between outer surface 182 and flexible substrate 110 (as illustrated in FIGS. 7, 9, and 12). As an illustrative, non-exclusive example, sealing structure 120 may be operatively attached to flexible substrate 110 and may extend around a periphery of charge of composite material 140. Illustrative, non-exclusive examples of sealing structure 120 include a compression seal, a resilient seal, and/or a tubular resilient seal that may be formed from any suitable material, illustrative, non-exclusive examples of which include a resilient material, a polymeric material, latex, and/or urethane. This may include materials that do not adhere to, chemically react with, and/or transfer a contaminant to outer surface 182 and/or to charge of composite material 140.

FIGS. 6-13 provide less schematic but still illustrative, non-exclusive examples of process flows for a composite structure manufacturing apparatus 20 according to the present disclosure. It is within the scope of the present disclosure that any of the process flows and/or structures that are illustrated in any of FIGS. 6-13 may be included in composite structure manufacturing apparatus 20 of FIG. 3. Similarly, composite structure manufacturing apparatus 20 may include and/or utilize composite-substrate assemblies 100 (such as composite-substrate assemblies 100 of FIGS. 4-5) that include a charge of composite material 140 that is operatively attached to a flexible substrate 110 to create and/or fabricate at least a portion of composite structures 800.

Figure 13:
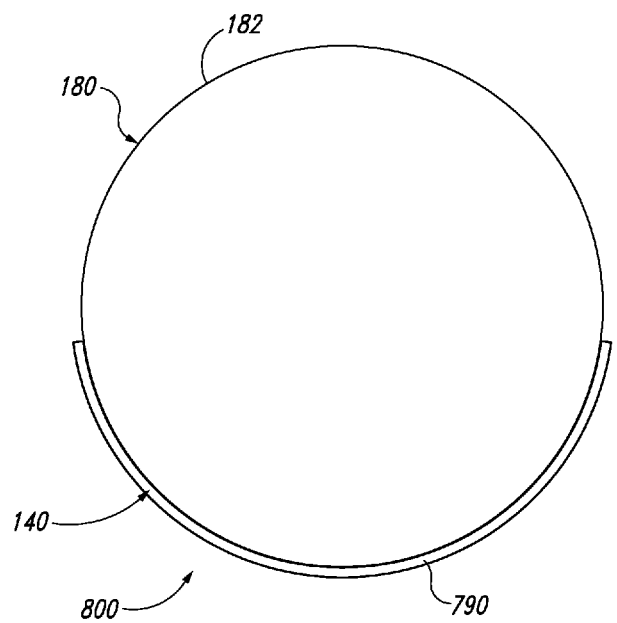
FIG. 13 is a schematic representation of a non-planar skin of a composite structure that is formed from a charge of composite material and is operatively attached to a layup mandrel.

As discussed in more detail herein, this fabrication may include forming composite-substrate assembly 100 to define an initial conformation 106 thereof (as illustrated in FIGS. 4-6, 8, and 10) and pressing composite-substrate assembly 100 against an outer surface 182 of a layup mandrel 180 to deform composite-substrate assembly 100 to a final conformation 109 that is different from the initial conformation (as illustrated in FIGS. 7, 9, and 12). Subsequently, charge of composite material 140 may be released from flexible substrate 110 but retained on outer surface 182 (as illustrated in FIG. 13). Additional illustrative, non-exclusive examples of process flows that may utilize a composite-substrate assembly to locate a charge of composite material on an outer surface of a layup mandrel are disclosed in U.S. patent application Ser. No. 14/018,268, which is entitled SYSTEMS AND METHODS FOR ASSEMBLING A SKIN OF A COMPOSITE STRUCTURE, was filed on Sep. 4, 2013, and the complete disclosure of which is hereby incorporated by reference.

Figure 6:
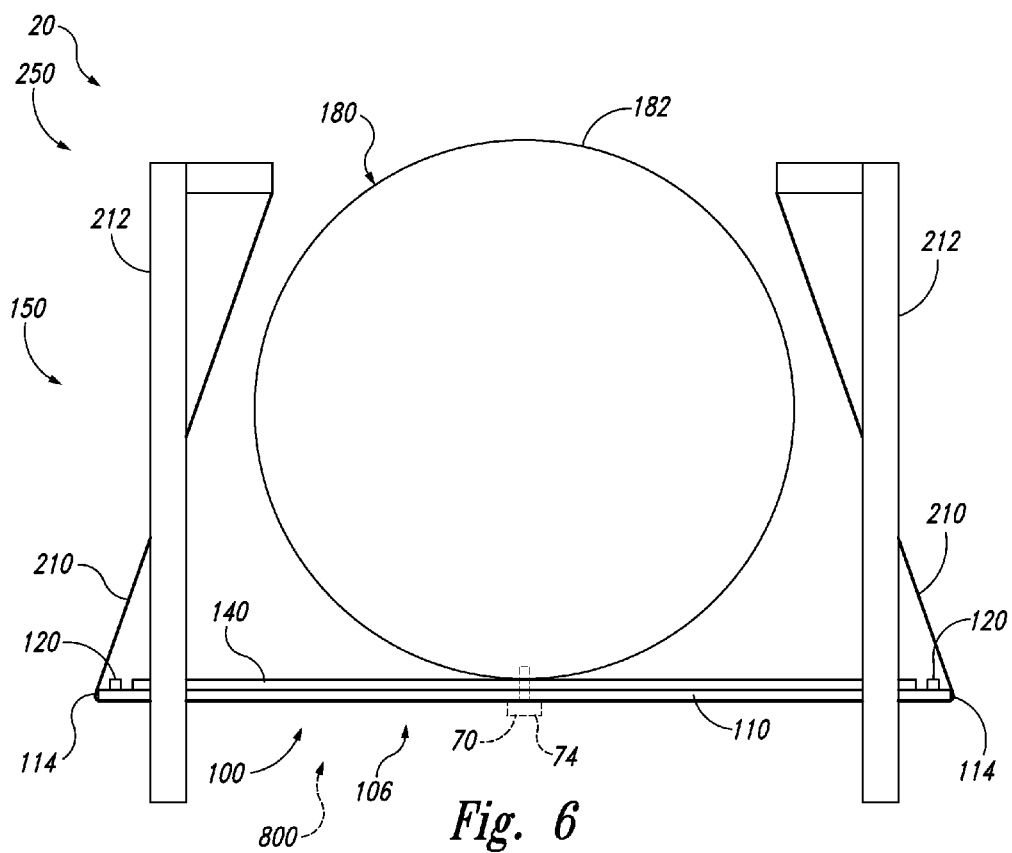
FIG. 6 is a schematic representation of a first process flow according to the present disclosure for assembling a composite structure.

FIGS. 6-7 are schematic representations of a first process flow 250 according to the present disclosure for assembling a composite structure 800. In FIGS. 6-7, assembly deformation structure 150 includes a tether 210, which also may be referred to herein as a strap 210, and a plurality of support structures 212. Tether 210 may be configured to draw composite-substrate assembly 100 around outer surface 182 of layup mandrel 180 to deform composite-substrate assembly 100 to final conformation 109. Support structures 212 may be configured to support tether 210.

As illustrated in FIG. 6, composite-substrate assembly 100 initially may be in initial conformation 106, and a locating assembly 70 may be utilized to operatively locate charge of composite material 140 relative to outer surface 182. Additionally or alternatively, a retention structure 74 may be utilized to retain a portion of composite material 140 in contact with layup mandrel 180. As illustrated in FIG. 7, tether 210 may be configured to draw composite-substrate assembly 100 around outer surface 182. This may include drawing edges 114 of flexible substrate 110 toward one another and/or toward outer surface 182. Subsequently, one or more retention structures 74 may be utilized to operatively retain composite-substrate assembly 100 proximal to and/or in contact with outer surface 182.

Additionally or alternatively, drawing composite-substrate assembly 100 around outer surface 182 also may include contacting sealing structure 120 with outer surface 182. Subsequently, a skin compaction assembly 130 may be utilized to apply a compaction vacuum to a compaction vacuum manifold 132, which may be at least partially defined by flexible substrate 110, to compact charge of composite material 140 on outer surface 182.

Then, and as illustrated in FIG. 13, charge of composite material 140 may be released from flexible substrate 110 but retained on outer surface 182 of layup mandrel 180. This may include releasing a retention vacuum that is applied between flexible substrate 110 and charge of composite material 140, as discussed in more detail herein, and charge of composite material 140 then may define at least a portion of a non-planar skin 790 of composite structure 800.

Tether 210 may draw composite-substrate assembly 100 toward outer surface 182 in any suitable manner. As an illustrative, non-exclusive example, tether 210 may be in contact with and/or may extend around a side of flexible substrate 110 that is opposed to charge of composite material. As another illustrative, non-exclusive example, tether 210 may be operatively attached to edges 114 of flexible substrate 110. Regardless of the exact configuration, support structures 212 and layup mandrel 180 may be located relative to one another such that shortening and/or tightening of a portion of tether 210 that extends between support structures 212 and composite-substrate assembly 100, movement of layup mandrel 180 generally toward composite-substrate assembly 100 (such as in a generally downward direction as illustrated in FIGS. 6-7), and/or movement of composite-substrate assembly 100 generally toward layup mandrel 180 (such as in a generally upward direction as illustrated in FIGS. 6-7) causes composite-substrate assembly 100 to press against and/or to be drawn around outer surface 182.

FIGS. 6-7 illustrate composite-substrate assembly 100 as being located vertically below layup mandrel 180 while being pressed against outer surface 182. However, it is within the scope of the present disclosure that composite-substrate assembly 100, layup mandrel 180, tether 210, and/or support structures 212 may define any suitable orientation, or relative orientation, prior to, during, and/or after charge of composite material 100 is pressed against outer surface 182.

As an illustrative, non-exclusive example, composite-substrate assembly 100 may be located vertically above layup mandrel 180, and tether 210 may be utilized to draw edges 114 downward such that composite-substrate assembly 100 is pressed against outer surface 182. As another illustrative, non-exclusive example, composite-substrate assembly may be located horizontally to a side of layup mandrel 180.

FIGS. 8-9 are schematic representations of a second process flow 260 according to the present disclosure for assembling a composite structure 800. In FIGS. 8-9, composite structure manufacturing apparatus 20 may include a conveyance structure 92, which is configured to translate and/or locate layup mandrel 180 and composite-substrate assembly 100 relative to one another to define a target, or desired, relative orientation therebetween. As illustrated in FIG. 8, and subsequent to composite-substrate assembly 100 and layup mandrel 180 being oriented as desired, a locating assembly 70 and/or a retention structure 74 may be utilized to retain, or fix, the desired orientation. Then, composite-substrate assembly 100 may be pressed against an outer surface 182 of layup mandrel 180, as discussed herein, and deformed from an initial conformation 106 (as illustrated in FIG. 8) to a final conformation 109 (as illustrated in FIG. 9). This may include forming a fluid seal between a sealing structure 120 that is associated with composite-substrate assembly 100 and outer surface 182. In addition, and as illustrated in dashed lines, one or more retention structures 74 may be utilized to retain composite-substrate assembly 100 in final conformation 109 and/or to retain contact between charge of composite material 140 and outer surface 182.

Then, a skin compaction assembly 130 may apply a compaction vacuum to a compaction vacuum manifold 132 to compact charge of composite material 140 against outer surface 182. The compaction vacuum manifold may be at least partially defined by a flexible substrate 110 of composite-substrate assembly 100, as discussed herein. Subsequently, and as illustrated in FIG. 13, charge of composite material 140 may be released from flexible substrate 110 but retained on outer surface 182 of layup mandrel 180. This may include releasing a retention vacuum that is applied between flexible substrate 110 and charge of composite material 140, as discussed in more detail herein, and charge of composite material 140 then may define at least a portion of a non-planar skin 790 of composite structure 800.

Returning to FIGS. 8-9, it is within the scope of the present disclosure that conveyance structure 92 may be utilized to define any suitable relative orientation between composite-substrate assembly 100 and layup mandrel 180. This may include locating and/or orienting the composite-substrate assembly vertically above the layup mandrel, vertically below the layup mandrel, horizontally to a side of the layup mandrel, and/or any suitable combination of these relative orientations (such as below and to the left, as illustrated).

With this in mind, conveyance structure 92 also may include a rotation structure 96 that is configured to permit rotation of composite-substrate assembly about a rotational axis. This may permit conveyance structure 92 to locate charge of composite material 140 between flexible substrate 110 and outer surface 182 regardless of the relative orientation between composite-substrate assembly 100 and layup mandrel 180.

It is within the scope of the present disclosure that composite-substrate assembly 100 may be deformed from initial conformation 106 to final conformation 109 in any suitable manner. As an illustrative, non-exclusive example, composite structure manufacturing apparatus 20 may include an assembly deformation structure 150 that is configured to generate a first external force 244 and/or a second external force 246, which may be applied to composite-substrate assembly 100 to urge composite-substrate assembly 100 from initial conformation 106 to final conformation 109. As illustrated in dashed lines in FIG. 9, assembly deformation structure 150 may form a portion of flexible substrate 110 and/or may be in contact with at least a portion of flexible substrate 110.

As another illustrative, non-exclusive example, conveyance structure 92 may be configured to locate composite-substrate assembly 100 vertically above layup mandrel 182. Then, composite-substrate assembly 100 may be draped across outer surface 182, swept onto outer surface 182, and/or pressed into contact with outer surface 182 under the influence of gravity and/or via application of first external force 244 and/or second external force 246.

Figure 10:
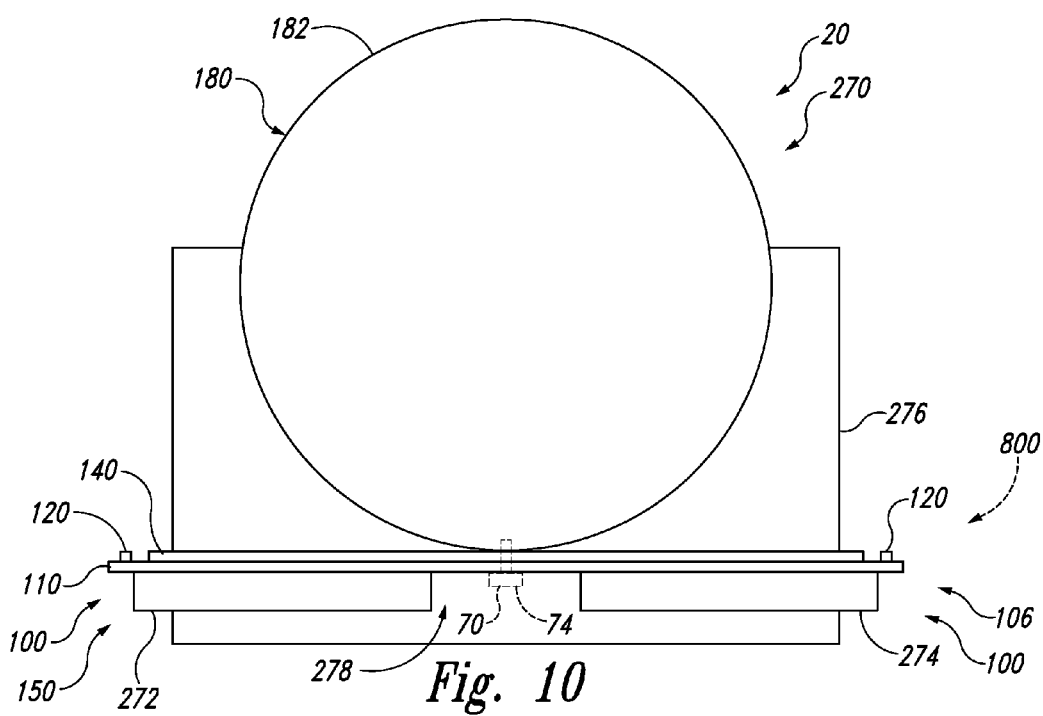
FIG. 10 is a schematic representation of a third process flow according to the present disclosure for assembling a composite structure.
Figure 11:
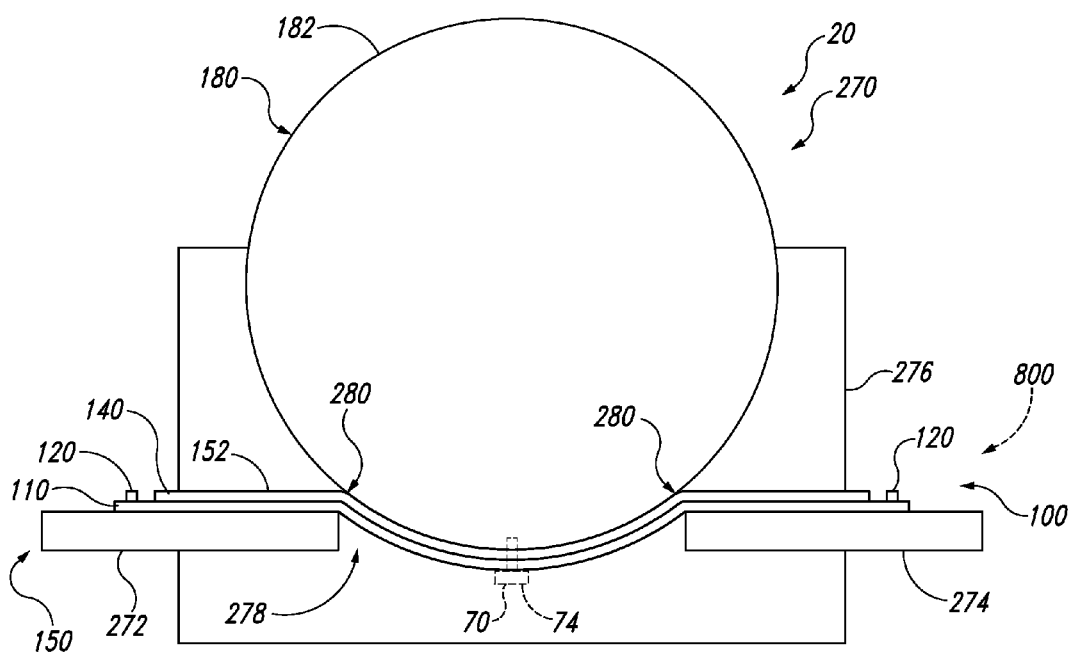
FIG. 11 is another schematic representation of the third process flow according to the present disclosure for assembling a composite structure.

FIGS. 10-12 are schematic representations of a third process flow 270 according to the present disclosure for assembling a composite structure 800. In FIGS. 10-12, a composite structure manufacturing apparatus 20 may include a layup mandrel 180, which defines an outer surface 182, an assembly deformation structure 150, and a composite-substrate assembly 100, which includes a flexible substrate 110 and a charge of composite material 140. Assembly deformation structure 150 includes a first support surface 272, which is configured to support a first portion of composite-substrate assembly 100, and a second support surface 274, which is configured to support a second portion of composite-substrate assembly 100. Assembly deformation structure 150 also includes a translating mechanism 276 that is configured to move layup mandrel 180, first support surface 272, and second support surface 274 relative to one another.

As illustrated in FIG. 10, composite-substrate assembly 100 initially may be in an initial conformation 106 and may be located near, proximal to, and/or in contact with a portion of outer surface 182. In this conformation, flexible substrate 110 may be in contact with first support surface 272 and/or with second support surface 274. Additionally or alternatively, flexible substrate 110 may be located between first support surface 272 and charge of composite material 140 and/or may be located between second support surface 274 and charge of composite material 140. In addition, first support surface 272 and second support surface 274 may be oriented such that a longitudinal opening 278 is defined therebetween, and an unsupported portion of composite-substrate assembly 100 may extend across longitudinal opening 278. Longitudinal opening 278 also may be referred to herein as a longitudinal space 278, a longitudinal gap 278, and/or a longitudinal separation 278.

As illustrated in dashed lines in FIG. 10, a locating assembly 70 may be utilized to locate charge of composite material 140 relative to layup mandrel 180. Additionally or alternatively, a retention structure 74 may be utilized to retain the charge of composite material near, proximal to, and/or in contact with the portion of outer surface 182.

In FIG. 10, a longitudinal axis of layup mandrel 180 may be at least substantially parallel to longitudinal opening 278. Additionally or alternatively, layup mandrel 180 may be located over longitudinal opening 278 and/or composite-substrate assembly 100 may extend between longitudinal opening 278 and layup mandrel 180. Furthermore, layup mandrel 180 (or outer surface 182 thereof) may contact the portion of composite-substrate assembly that extends across longitudinal opening 278 (i.e., the unsupported portion of composite-substrate assembly 100).

Subsequently, and as illustrated in FIG. 11, translating mechanism 276 may move layup mandrel, first support surface, and/or second support surface relative to one another such that layup mandrel 180 contacts and/or presses against charge of composite material 140 and urges charge of composite material 140 into and/or through longitudinal opening 278. In FIG. 10, this may include moving layup mandrel 180 in a downward direction and/or moving both first support surface 272 and second support surface 274 in an upward direction, although other relative orientations and motions are also within the scope of the present disclosure. In addition, translating mechanism 276 also may move first support surface 272 and second support surface 274 away from one another, thereby increasing a width of longitudinal opening 278.

Assembly deformation structure 150, including first support surface 272 and/or second support surface 274 thereof, may be configured and/or oriented relative to layup mandrel 180 such that charge of composite material 140 is maintained in tension by flexible substrate 110 immediately prior to contact between charge of composite material 140 and layup mandrel 180. This may decrease a potential for wrinkling of charge of composite material 140 upon conforming to outer surface 182 of layup mandrel 180 and may be accomplished by forming a convex surface profile on first side 152 of charge of composite material 140, as indicated in FIG. 11 at 280. This tension within charge of composite material 140 may be maintained in at least one direction, such as a direction that is perpendicular to a line of contact between charge of composite material 140 and layup mandrel 180.

This relative motion of layup mandrel 180, first support surface 272, and second support surface 274 may be continued until charge of composite material 140 (or a side thereof) is at least substantially completely in contact with outer surface 182, thereby defining final conformation 109 of composite-substrate assembly 100, as illustrated in FIG. 12. This further may include forming a fluid seal between a sealing structure 120 and outer surface 182. Then, a skin compaction assembly 130 may apply a compaction vacuum to a compaction vacuum manifold 132, thereby compacting charge of composite material 140 onto outer surface 182.

Subsequently, and as illustrated in FIG. 13, charge of composite material 140 may be released from flexible substrate 110 but retained on outer surface 182 of layup mandrel 180. This may include releasing a retention vacuum that is applied between flexible substrate 110 and charge of composite material 140, as discussed in more detail herein, and charge of composite material 140 then may define at least a portion of a non-planar skin 790 of composite structure 800.

Figure 14:
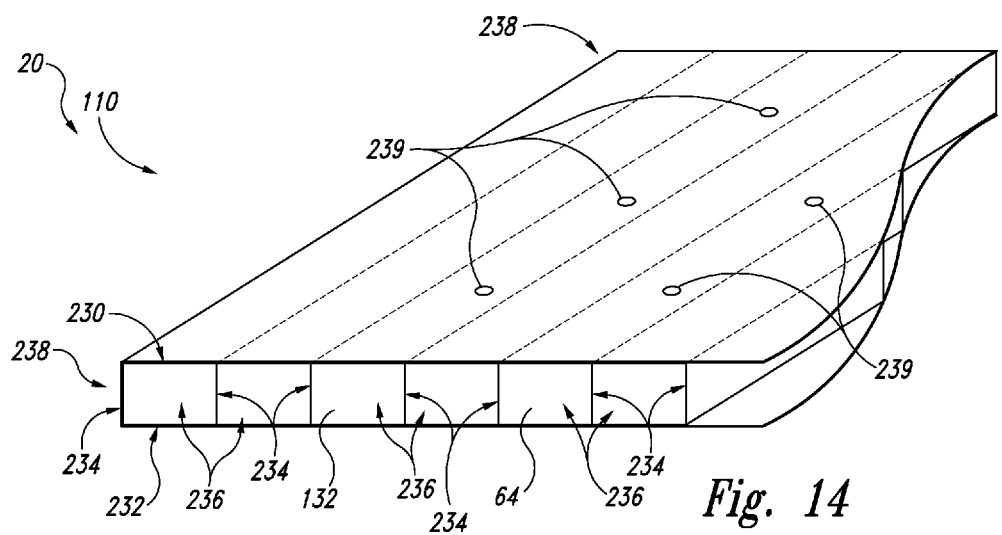
FIG. 14 is a less schematic but still illustrative, non-exclusive example of a flexible substrate that may be utilized with and/or included in the systems and methods according to the present disclosure.

FIG. 14 is a less schematic but still illustrative, non-exclusive example of a flexible substrate 110 that may be utilized with and/or included in the systems and methods according to the present disclosure, and flexible substrate 110 of FIG. 14 may be utilized with any of the composite structure manufacturing apparatus 20 that are disclosed herein with reference to any of FIGS. 3-12. Flexible substrate 110 of FIG. 14 includes a first planar wall 230, a second, opposed planar wall 232, and a plurality of elongate webs 234 that extend between first planar wall 230 and second planar wall 232. Planar walls 230 and 232, together with the plurality of elongate webs 234, define a plurality of elongate channels 236 that extend within flexible substrate 110. As illustrated, elongate channels 236 may be in fluid communication with a plurality of air holes 239, which may provide fluid communication between elongate channels 236 and interface 102 when charge of composite material 140 is operatively attached to flexible substrate 110 (as illustrated in FIG. 4). Thus, a portion of air holes 239, together with one or more elongate channels 236 may function as (or define at least a portion of) retention vacuum manifold 64. Similarly, a different portion of air holes 239, together with one or more other elongate channels 236, may function as (or define at least a portion of) compaction vacuum manifold 132.

It is within the scope of the present disclosure that channels 236 may extend along a longitudinal axis that is parallel to first planar wall 230 and/or second planar wall 232, may extend from an edge 238 of flexible substrate 110, may extend from a first edge 238 of flexible substrate 110 to a second edge 238 of flexible substrate 110, and/or may extend between two opposed edges 238 of flexible substrate 110.

Figure 15:
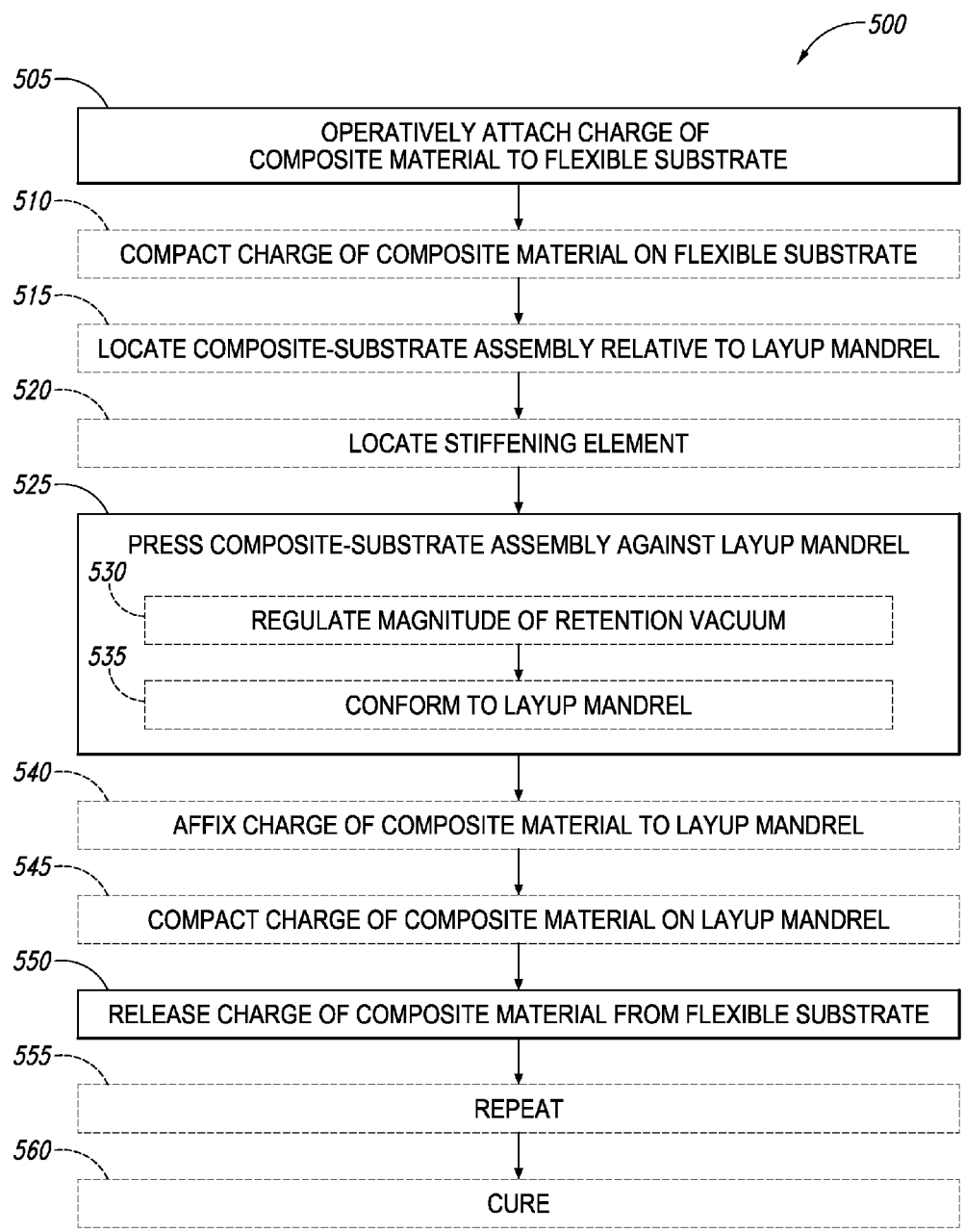
FIG. 15 is a flowchart depicting methods according to the present disclosure of assembling a skin of a composite structure on an outer surface of a layup mandrel.

FIG. 15 is a flowchart depicting methods 500 according to the present disclosure of assembling a skin of a composite structure on an outer surface of a layup mandrel. Methods 500 include operatively attaching a charge of composite material to a flexible substrate to define a composite-substrate assembly at 505 and may include compacting the charge of composite material on the flexible substrate at 510, locating the composite-substrate assembly relative to a layup mandrel at 515, and/or locating a stiffening element at 520. Methods 500 further include pressing the composite-substrate assembly against an outer surface of the layup mandrel at 525 and may include affixing the charge of composite material to the layup mandrel at 540 and/or compacting the charge of composite material on the layup mandrel at 545. Methods 500 further include releasing the charge of composite material from the flexible substrate at 550 and may include repeating at least a portion of the methods at 555 and/or curing the charge of composite material at 560.

Operatively attaching the charge of composite material to the flexible substrate to define the composite-substrate assembly at 505 may include operatively attaching any suitable charge of composite material to any suitable flexible substrate in any suitable manner to form and/or define an initial conformation for the composite-substrate assembly. Illustrative, non-exclusive examples of the charge of composite material, the flexible substrate, and the initial conformation for the composite-substrate assembly are disclosed herein.

As an illustrative, non-exclusive example, the operatively attaching at 505 may include laying up a plurality of plies of composite material on the flexible substrate and/or sequentially attaching the plurality of plies of composite material to the flexible substrate to form the charge of composite material. As another illustrative, non-exclusive example, the operatively attaching at 505 also may include simultaneously attaching the plurality of plies of composite material to the flexible substrate to form the charge of composite material.

As yet another illustrative, non-exclusive example, the operatively attaching at 505 also may include applying a retention vacuum between the charge of composite material and the flexible substrate, such as via a retention vacuum manifold that is defined, at least in part, by the flexible substrate. When the operatively attaching at 505 includes applying the retention vacuum, methods 500 further may include maintaining the retention vacuum during the pressing at 525. As another illustrative, non-exclusive example, the operatively attaching at 505 also may include defining an interface between the flexible substrate and the charge of composite material.

It is within the scope of the present disclosure that the operatively attaching at 505 may be performed in any suitable sequence during methods 500. As illustrative, non-exclusive examples, the operatively attaching at 505 may be performed prior to the pressing at 525 and/or prior to the releasing at 550.

Compacting the charge of composite material on (or onto) the flexible substrate at 510 may include compacting the charge of composite material in any suitable manner. As illustrative, non-exclusive examples, the compacting at 510 may include compressing the charge of composite material, decreasing a volume of the charge of composite material, pressing the charge of composite material onto the flexible substrate, and/or increasing an adhesive force between the charge of composite material and the flexible substrate. As a more specific but still illustrative, non-exclusive example, the compacting at 510 also may include vacuum bagging the charge of composite material on the flexible substrate and/or utilizing a vacuum chuck to compact the charge of composite material on the flexible substrate. It is within the scope of the present disclosure that the compacting at 510 may be performed in any suitable sequence during methods 500. As an illustrative, non-exclusive example, the compacting at 510 may be performed subsequent to the operatively attaching at 505. As another illustrative, non-exclusive example, the compacting at 510 may be performed prior to the pressing at 525.

Locating the composite-substrate assembly relative to the layup mandrel at 515 may include indexing, aligning, precisely aligning, and/or accurately aligning the composite-substrate assembly relative to the layup mandrel. Additionally or alternatively, the locating at 515 also may include locating the composite-substrate assembly and the layup mandrel proximal to, near, within a threshold distance of, and/or in contact with one another. This may include locating subsequent to the operatively attaching at 505, prior to the pressing at 525, and/or during the pressing at 525.

As an illustrative, non-exclusive example, the locating at 515 may include inserting one or more pins through the composite-substrate assembly (or the flexible substrate thereof) and into the layup mandrel (i.e., pinning the composite-substrate assembly to the layup mandrel). This may include orienting the composite-substrate assembly relative to the layup mandrel and/or retaining the composite-substrate assembly on, near, and/or in contact with the layup mandrel.

As another illustrative, non-exclusive example, the locating at 515 also may include pinning a central portion of the composite-substrate assembly to the layup mandrel prior to performing the pressing at 525 and then performing the pressing at 525 to at least partially deform the composite-substrate assembly to a final conformation. Subsequently, the locating at 515 further may include pinning a peripheral portion of the composite-substrate assembly to the layup mandrel to retain the composite-substrate assembly on the layup mandrel.

Locating the stiffening element at 520 may include locating any suitable stiffening element, such as a stringer, that may be utilized with, associated with, and/or in contact with the charge of composite material when the charge of composite material forms a portion of the skin of the composite structure. As an illustrative, non-exclusive example, the locating at 520 may include locating the stiffening element within a stiffening element recess of the layup mandrel. Under these conditions, the pressing at 525 additionally or alternatively may include pressing the charge of composite material against the stiffening element.

Pressing the composite-substrate assembly against the outer surface of the layup mandrel at 525 may include pressing to deform the composite-substrate assembly to the final conformation, which is different from the initial conformation. Illustrative, non-exclusive examples of the initial conformation and the final conformation are discussed herein.

This may include deforming the composite-substrate assembly such that the composite-substrate assembly defines a concave side and an opposed convex side. Under these conditions, the charge of composite material may be located on and/or form at least a portion of the concave side, while the flexible substrate may be located on and/or form at least a portion of the convex side.

It is within the scope of the present disclosure that the composite-substrate assembly may be oriented in any suitable relative orientation during the pressing at 525. As illustrative, non-exclusive examples, the pressing at 525 may include orienting the composite-substrate assembly such that the concave side faces in a (substantially) vertical direction, in a (substantially) horizontal direction, in a (substantially) upward direction, and/or in a (substantially) downward direction.

The pressing at 525 may be accomplished in any suitable manner. As an illustrative, non-exclusive example, the flexible substrate may define a first edge and a substantially opposed second edge, and the pressing at 525 may include urging the first edge toward the second edge. As another illustrative, non-exclusive example, the pressing at 525 may include heating the charge of composite material to facilitate deformation thereof during the pressing at 525. As yet another illustrative, non-exclusive example, the pressing at 525 may include applying a first deformation force to the flexible substrate and applying a second deformation force to the charge of composite material to compress the charge of composite material between the flexible substrate and the outer surface of the layup mandrel.

The first deformation force may be directed toward the layup mandrel and may include any suitable gravitational force, mechanically applied force, pressure force, pneumatic force, hydraulic force, and/or vacuum force. The first deformation force may be applied to the flexible substrate in any suitable manner. As an illustrative, non-exclusive example, the first deformation force may be applied with an assembly deformation structure, which may be separate, distinct, and/or spaced apart from the layup mandrel. Illustrative, non-exclusive examples of the assembly deformation structure are disclosed within.

The second deformation force may be directed away from the outer surface of the layup mandrel and/or toward the charge of composite material. As an illustrative, non-exclusive example, the second deformation force may be applied to the charge of composite material by the outer surface of the layup mandrel.

It is within the scope of the present disclosure that the pressing at 525 may be performed in any suitable sequence during methods 500. As illustrative, non-exclusive examples, the pressing at 525 may be performed subsequent to the operatively attaching at 505 and/or prior to the releasing at 550.

As a more specific but still illustrative, non-exclusive example, the pressing at 525 may include extending a piston, such as to generate the first deformation force. When the pressing at 525 includes extending the piston, methods 500 further may include receiving the piston within a respective indexing recess that is defined by the layup mandrel. This may align and/or locate the charge of composite material relative to the outer surface of the layup mandrel. As such, the piston may be configured to perform both the pressing at 525 and the locating at 515.

As another more specific but still illustrative, non-exclusive example, the pressing at 525 also may include drawing the composite-substrate assembly toward the outer surface of the layup mandrel with one or more tethers, illustrative, non-exclusive examples of which are disclosed herein. This may include drawing the first edge of the flexible substrate and the second edge of the flexible substrate toward one another with the tether.

As yet another more specific but still illustrative, non-exclusive example, the locating at 515 may include orienting the composite-substrate assembly vertically above the layup mandrel. Under these conditions, the pressing at 525 may include utilizing a gravitational force to press the charge of composite material against the outer surface of the layup mandrel and/or to deform the composite-substrate assembly to the final conformation. Additionally or alternatively, the pressing at 525 also may include regulating the conformation of the flexible substrate, such as via the assembly deformation structure, to deform the composite-substrate assembly to the final conformation.

As another more specific but still illustrative, non-exclusive example, the pressing at 525 may include sweeping the composite-substrate assembly against the outer surface of the layup mandrel. As another more specific but still illustrative, non-exclusive example, the pressing at 525 also may include applying the first deformation force to an edge of the composite-substrate assembly to urge the composite-substrate assembly toward the outer surface of the layup mandrel.

As another more specific but still illustrative, non-exclusive example, methods 500 further may include supporting a first portion of the composite-substrate assembly with a first support surface and also supporting a second portion of the composite-substrate assembly with a second support surface. The second support surface may be spaced apart from the first support surface to define a longitudinal opening therebetween, and an unsupported portion of the composite-substrate assembly may extend across the longitudinal opening.

Under these conditions, the locating at 515 may include orienting the composite-substrate assembly and the layup mandrel relative to one another such that a longitudinal axis of the layup mandrel is at least substantially parallel to the longitudinal opening. Then, the pressing at 525 may include contacting the outer surface of the layup mandrel with the unsupported portion of the composite-substrate assembly. Additionally or alternatively the pressing at 525 also may include moving the layup mandrel, the first support surface, and/or the second support surface relative to one another such that the layup mandrel is located within (or moves into) the longitudinal opening and/or such that the layup mandrel urges the charge of composite material into, or through, the longitudinal opening. This may include moving the first support surface and the second support surface away from one another to increase a width of the longitudinal opening and/or to permit at least a portion of the layup mandrel to enter, be located within, and/or pass through the longitudinal opening.

When the operatively attaching at 505 includes applying the retention vacuum, methods 500 further may include regulating at 530 a magnitude of the retention vacuum that retains the charge of composite material on the flexible substrate. The regulating at 530 may include regulating to control a motion (or slipping) of the charge of composite material and the flexible substrate relative to one another during the pressing at 525. This may include increasing a magnitude of the retention vacuum to decrease the motion (or slipping) and/or decreasing the magnitude of the retention vacuum to increase the motion (or slipping).

The pressing at 525 further may include conforming the composite-substrate assembly to the layup mandrel at 535. This may include conforming any suitable component and/or element of the composite-substrate assembly to the layup mandrel. As an illustrative, non-exclusive example, the conforming at 535 may include conforming the charge of composite material (and/or a surface thereof) to the outer surface of the layup mandrel and/or to a contour of the outer surface of the layup mandrel. As another illustrative, non-exclusive example, the conforming at 535 also may include conforming the flexible substrate (and/or a surface thereof) to the outer surface of the layup mandrel and/or to the contour of the outer surface of the layup mandrel.

Affixing the charge of composite material to the layup mandrel at 540 may include affixing the charge of composite material to the outer surface of the layup mandrel and may be performed prior to the releasing at 550. As an illustrative, non-exclusive example, the affixing at 540 may include locating the charge of composite material between the flexible substrate and the layup mandrel. As another illustrative, non-exclusive example, the affixing at 540 also may include adhering the charge of composite material to the outer surface of the layup mandrel, such as with an adhesive. As yet another illustrative, non-exclusive example, the affixing at 540 further may include establishing direct contact, mechanical contact, and/or physical contact between the charge of composite material (or a side thereof) and the outer surface of the layup mandrel (or an intermediate material that extends between the charge of composite material and the outer surface of the layup mandrel) and/or producing an interface between the charge of composite material and the layup mandrel. As another illustrative, non-exclusive example, the affixing at 540 also may include compressing the charge of composite material against the outer surface of the layup mandrel, such as during the pressing at 525.

Compacting the charge of composite material on the layup mandrel at 545 may include compacting the charge of composite material in any suitable manner and/or for any suitable compaction time. As an illustrative, non-exclusive example, the compacting at 545 may include applying a compaction vacuum between the flexible substrate and the outer surface of the layup mandrel. This may include applying the compaction vacuum with a compaction vacuum manifold that is (at least partially) defined by the flexible substrate. Illustrative, non-exclusive examples of the compaction time include compaction times of at least 1 minute, at least 2 minutes, at least 3 minutes, at least 4 minutes, at least 5 minutes, at least 10 minutes, at least 15 minutes, or at least 20 minutes. Additional illustrative, non-exclusive examples of the compaction time include compaction times of less than 120 minutes, less than 115 minutes, less than 90 minutes, less than 75 minutes, less than 60 minutes, less than 45 minutes, less than 30 minutes, less than 15 minutes, or less than 10 minutes.

Releasing the charge of composite material from the flexible substrate at 550 may include releasing in any suitable manner. As an illustrative, non-exclusive example, the releasing at 550 may include releasing the charge of composite material from the flexible substrate while retaining the charge of composite material on (or attached to) the outer surface of the layup mandrel (or the intermediate material). As another illustrative, non-exclusive example, the releasing at 550 also may include separating the charge of composite material from the flexible substrate, such as by separating at the interface between the charge of composite material and the flexible substrate. As yet another illustrative, non-exclusive example, and when the operatively attaching at 505 includes applying the retention vacuum, the releasing at 550 also may include ceasing the application of the retention vacuum.

Repeating at least a portion of the methods at 555 may include repeating any suitable portion of methods 500 any suitable number of times. As an illustrative, non-exclusive example, the charge of composite material may be a first charge of composite material and the repeating at 555 may include repeating at least the operatively attaching at 505, the pressing at 525, and the releasing at 550 a plurality of times to affix and/or to retain a respective plurality of charges of composite material on the outer surface of the layup mandrel and/or to define the, or the entire, skin for the composite structure.

As another illustrative, non-exclusive example, the composite-substrate assembly may be a first composite-substrate assembly and the repeating at 555 may include repeating the operatively attaching a plurality of times to generate a plurality of composite-substrate assemblies that include a respective plurality of flexible substrates and a respective plurality of charges of composite material. Under these conditions, the repeating at 555 further may include repeating the pressing at 525 and the releasing at 550 a plurality of times with the plurality of composite-substrate assemblies to retain the respective plurality of charges of composite material on the outer surface of the layup mandrel and/or to define the, or the entire, skin for the composite structure.

Curing the charge of composite material at 560 may include curing the charge of composite material on the layup mandrel in any suitable manner. This may include curing the charge of composite material to generate and/or produce the skin of the composite structure. As an illustrative, non-exclusive example, the curing at 560 may include applying heat and/or pressure to the charge of composite material. As additional illustrative, non-exclusive examples, the curing at 560 also may include locating the layup mandrel and the charge of composite material within a curing oven, directing a heat lamp toward the charge of composite material, and/or covering the charge of composite material with a heat blanket.

Figure 16:
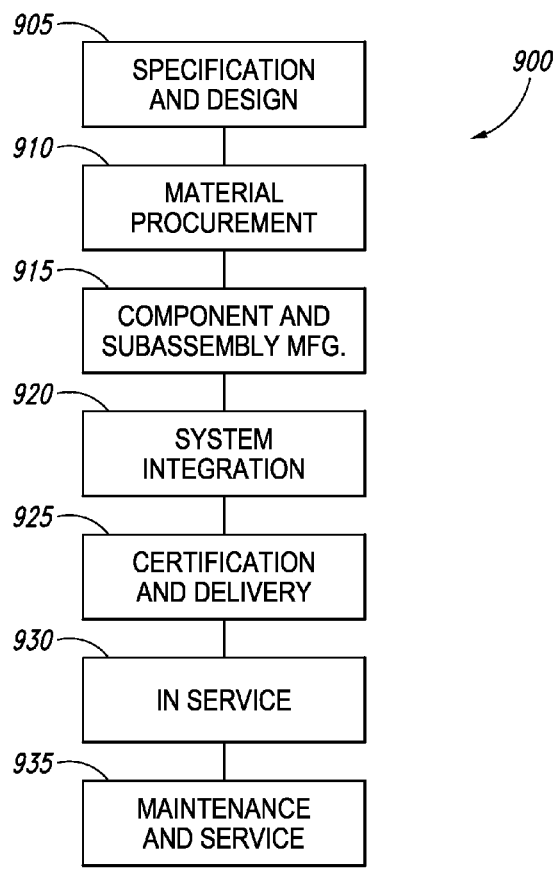
FIG. 16 is a flow diagram of aircraft production and service methodology.
Figure 17:
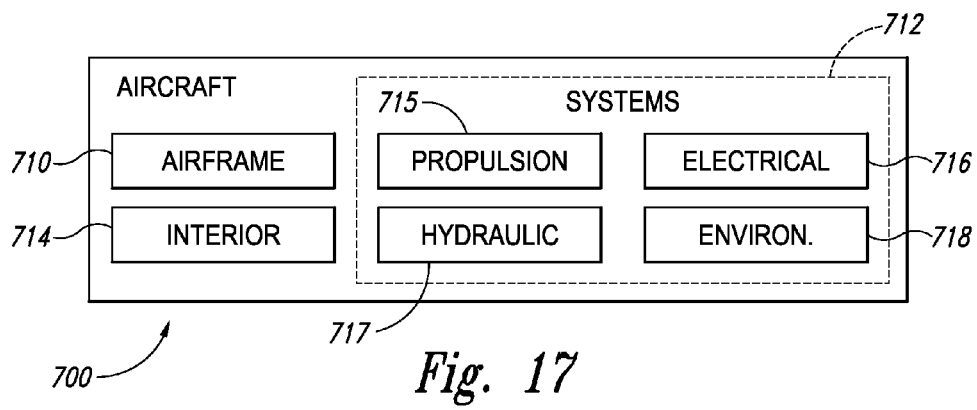
FIG. 17 is a block diagram of an aircraft.

Referring now to FIGS. 16-17, embodiments of the disclosure may be described in the context of an aircraft manufacturing and service method 900, as shown in FIG. 16, and an aircraft 700, as shown in FIG. 17. During preproduction, exemplary method 900 may include specification and design 905 of the aircraft 700 and material procurement 910. During production, component and subassembly manufacturing 915 and system integration 920 of the aircraft 700 takes place. Thereafter, the aircraft 700 may go through certification and delivery 925 in order to be placed in service 930. While in service by a customer, the aircraft 700 is scheduled for routine maintenance and service 935 (which also may include modification, reconfiguration, refurbishment, and so on).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 17, the aircraft 700 produced by exemplary method 900 may include an airframe 710 with a plurality of systems 712 and an interior 714. Examples of high-level systems 712 include one or more of a propulsion system 715, an electrical system 716, a hydraulic system 717, and an environmental system 718. Any number of other systems may be included. Although an aerospace example is shown, the principles of the invention may be applied to other industries, such as the automotive industry.

Apparatus and methods embodied herein may be employed during any one or more of the stages of the manufacturing and service method 900. For example, components or subassemblies corresponding to component and subassembly manufacturing process 915 may be fabricated or manufactured in a manner similar to components or subassemblies produced while the aircraft 700 is in service. Also, one or more apparatus embodiments, method embodiments, or a combination thereof may be utilized during the production stages 915 and 920, for example, by substantially expediting assembly of or reducing the cost of an aircraft 700. Similarly, one or more of apparatus embodiments, method embodiments, or a combination thereof may be utilized while the aircraft 700 is in service, for example and without limitation, to maintenance and service 935.

Illustrative, non-exclusive examples of inventive subject matter according to the present disclosure are described in the following enumerated paragraphs:

A1. A method of assembling a skin of a composite structure on an outer surface of a layup mandrel, the method comprising:

operatively attaching a charge of composite material to a flexible substrate to define an initial conformation for a composite-substrate assembly that includes the charge of composite material and the flexible substrate;

pressing the composite-substrate assembly against the outer surface of the layup mandrel to deform the composite-substrate assembly to a final conformation that is different from the initial conformation; and releasing the charge of composite material from the flexible substrate while retaining the charge of composite material on the outer surface of the layup mandrel.

A2. The method of paragraph A1, wherein the operatively attaching includes laying up a plurality of plies to form the charge of composite material on the flexible substrate, optionally with a layup tool.

A3. The method of any of paragraphs A1-A2, wherein the operatively attaching includes applying a retention vacuum between the charge of composite material and the flexible substrate, optionally with a retention vacuum manifold that is defined by the flexible substrate.

A4. The method of paragraph A3, wherein the method further includes maintaining the retention vacuum during the pressing to retain the charge of composite material on the flexible substrate.

A5. The method of any of paragraphs A3-A4, wherein the method further includes regulating a magnitude of the retention vacuum during the pressing to control a relative motion (or slipping) between the charge of composite material and the flexible substrate during the pressing.

A6. The method of any of paragraphs A1-A5, wherein the operatively attaching includes vacuum bagging the charge of composite material on the flexible substrate.

A7. The method of any of paragraphs A1-A6, wherein the charge of composite material comprises a plurality of composite plies, and optionally wherein the operatively attaching includes at least one of simultaneously attaching the plurality of composite plies to the flexible substrate and sequentially attaching the plurality of composite plies to the flexible substrate.

A8. The method of any of paragraphs A1-A7, wherein the operatively attaching includes defining an interface between the flexible substrate and the charge of composite material.

A9. The method of any of paragraphs A1-A8, wherein the pressing includes deforming the composite-substrate assembly such that the composite-substrate assembly defines a concave side and an opposed convex side.

A10. The method of paragraph A9, wherein the deforming includes deforming such that the charge of composite material is located on the concave side of the composite-substrate assembly.

A11. The method of any of paragraphs A9-A10, wherein the deforming includes deforming such that the flexible substrate is located on the convex side of the composite-substrate assembly.

A12. The method of any of paragraphs A9-A11, wherein, during the pressing, the method further includes orienting the composite-substrate assembly such that the concave side faces in at least one of a (substantially) vertical direction, a (substantially) horizontal direction, a (substantially) upward direction, and a (substantially) downward direction.

A13. The method of any of paragraphs A1-A12, wherein the pressing includes applying a first deformation force to the flexible substrate and applying a second deformation force to the charge of composite material to compress the charge of composite material between the flexible substrate and the outer surface of the layup mandrel.

A14. The method of paragraph A13, wherein the first deformation force is directed toward the outer surface of the layup mandrel.

A15. The method of any of paragraphs A13-A14, wherein the first deformation force includes at least one of (i) a gravitational force, (ii) a mechanically applied force, (iii) a pressure force, (iv) a pneumatic force, (v) a hydraulic force, and (vi) a vacuum force.

A16. The method of any of paragraphs A13-A15, wherein the method includes applying the first deformation force with an assembly deformation structure, optionally wherein the assembly deformation structure is separate from the layup mandrel.

A17. The method of any of paragraphs A13-A16, wherein the second deformation force is directed away from the outer surface of the layup mandrel.

A18. The method of any of paragraphs A13-A17, wherein the second deformation force is applied by the outer surface of the layup mandrel.

A19. The method of any of paragraphs A1-A18, wherein the method further includes heating the charge of composite material, optionally during the pressing.

A20. The method of any of paragraphs A1-A19, wherein the flexible substrate defines a first edge and a second edge that is (substantially) opposed to the first edge, and further wherein the pressing includes urging the first edge toward the second edge.

A21. The method of any of paragraphs A1-A20, wherein the pressing includes conforming the composite-substrate assembly to at least one of (i) the outer surface of the layup mandrel and (ii) a contour of the outer surface of the layup mandrel.

A22. The method of any of paragraphs A1-A21, wherein the pressing includes conforming the flexible substrate to at least one of (i) the outer surface of the layup mandrel and (ii) a/the contour of the outer surface of the layup mandrel.

A23. The method of any of paragraphs A1-A22, wherein the pressing includes conforming the charge of composite material to at least one of (i) the outer surface of the layup mandrel and (ii) a/the contour of the outer surface of the layup mandrel.

A24. The method of paragraph A23, wherein the method further includes pinning the composite-substrate assembly to the layup mandrel during the pressing to retain the charge of composite material in contact with the outer surface of the layup mandrel.

A25. The method of any of paragraphs A1-A24, wherein the pressing includes extending a piston.

A26. The method of paragraph A25, wherein the extending further includes receiving the piston within a respective indexing recess that is defined by the layup mandrel to align the charge of composite material with the outer surface of the layup mandrel.

A27. The method of any of paragraphs A1-A26, wherein the pressing includes drawing the composite-substrate assembly toward the outer surface of the layup mandrel with a tether, optionally with a plurality of tethers, and further optionally wherein the tether includes, or is, a strap.

A28. The method of paragraph A27, wherein the flexible substrate defines a/the first edge and a/the second edge that is (substantially) opposed to the first edge, and further wherein the drawing includes drawing the first edge and the second edge toward one another.

A29. The method of any of paragraphs A1-A28, wherein, prior to the pressing (and optionally subsequent to the operatively attaching), the method further includes orienting the composite-substrate assembly vertically above the layup mandrel, and further wherein the pressing includes utilizing a/the gravitational force to at least one of (i) press the charge of composite material against the outer surface of the layup mandrel and (ii) deform the composite-substrate assembly to the final conformation.

A30. The method of any of paragraphs A1-A29, wherein the pressing includes regulating a conformation of the flexible substrate to deform the composite-substrate assembly to the final conformation.

A31. The method of any of paragraphs A1-A30, wherein the pressing includes sweeping the composite-substrate assembly against the outer surface of the layup mandrel.

A32. The method of any of paragraphs A1-A31, wherein the pressing includes applying a deformation force to an edge of the composite-substrate assembly to urge the composite-substrate assembly toward the outer surface of the layup mandrel.

A33. The method of any of paragraphs A1-A32, wherein, prior to the pressing, the method further includes supporting a first portion of the composite-substrate assembly with a first support surface and supporting a second portion of the composite-substrate assembly with a second support surface, wherein the first support surface and the second support surface define a longitudinal opening therebetween.

A34. The method of paragraph A33, wherein the flexible substrate is located between the charge of composite material and the first support surface, and further wherein the flexible substrate is located between the charge of composite material and the second support surface.

A35. The method of any of paragraphs A33-A34, wherein the method further includes orienting the composite-substrate assembly and the layup mandrel relative to one another such that a longitudinal axis of the layup mandrel is (at least substantially) parallel to the longitudinal opening.

A36. The method of any of paragraphs A33-A35, wherein the pressing includes contacting the outer surface of the layup mandrel with a portion of the composite-substrate assembly that extends across the longitudinal opening.

A37. The method of any of paragraphs A33-A36, wherein the pressing includes moving the layup mandrel, the first support surface, and the second support surface relative to one another such that the layup mandrel is located within the longitudinal opening.

A38. The method of any of paragraphs A33-A37, wherein the pressing includes moving the layup mandrel, the first support surface, and the second support surface relative to one another such that the outer surface of the layup mandrel contacts the charge of composite material and urges the charge of composite material into the longitudinal opening.

A39. The method of any of paragraphs A33-A38, wherein the pressing includes moving the first support surface and the second support surface away from one another to increase a width of the longitudinal opening.

A40. The method of any of paragraphs A1-A39, wherein the method further includes affixing the charge of composite material to the outer surface of the layup mandrel.

A41. The method of paragraph A40, wherein the affixing includes locating the charge of composite material between the outer surface of the layup mandrel and the flexible substrate.

A42. The method of any of paragraphs A40-A41, wherein the affixing includes adhering the charge of composite material to the outer surface of the layup mandrel, optionally with an adhesive.

A43. The method of any of paragraphs A40-A42, wherein the affixing includes establishing (direct, mechanical, or physical) contact between the charge of composite material and the outer surface of the layup mandrel, optionally to produce an interface between the charge of composite material and the outer surface of the layup mandrel.

A44. The method of any of paragraphs A1-A43, wherein the releasing includes separating the charge of composite material from the flexible substrate, optionally at an/the interface between the charge of composite material and the flexible substrate.

A45. The method of any of paragraphs A1-A44, wherein the releasing includes ceasing a/the retention vacuum between the charge of composite material and the flexible substrate.

A46. The method of any of paragraphs A1-A45, wherein, subsequent to the operatively attaching and prior to the pressing, the method further includes compacting the charge of composite material onto the flexible substrate.

A47. The method of any of paragraphs A1-A46, wherein, prior to the releasing, the method further includes compacting the charge of composite material on the outer surface of the layup mandrel.

A48. The method of paragraph A47, wherein the compacting the charge of composite material on the outer surface of the layup mandrel includes applying a compaction vacuum between the flexible substrate and the outer surface of the layup mandrel, optionally with a compaction vacuum manifold that is defined by the flexible substrate.

A49. The method of any of paragraphs A1-A48, wherein the method further includes indexing the composite-substrate assembly to the layup mandrel, optionally prior to the pressing, optionally subsequent to the pressing, optionally during the pressing, and further optionally to align the composite-substrate assembly relative to the layup mandrel.

A50. The method of any of paragraphs A1-A49, wherein the method further includes pinning the composite-substrate assembly to the layup mandrel, optionally prior to the pressing, optionally subsequent to the pressing, optionally during the pressing, and further optionally to align the composite-substrate assembly relative to the layup mandrel.

A51. The method of paragraph A50, wherein the pinning includes pinning a central portion of the composite-substrate assembly to the layup mandrel, performing the pressing to at least partially deform the composite-substrate assembly to the final conformation, and subsequently pinning a peripheral portion of the composite-substrate assembly to the layup mandrel to retain the composite-substrate assembly on the layup mandrel.

A52. The method of any of paragraphs A1-A51, wherein the charge of composite material is a first charge of composite material, and further wherein the method includes repeating at least the operatively attaching, the pressing, and the releasing a plurality of times to retain a plurality of charges of composite material on the outer surface of the layup mandrel and define the skin for the composite structure.

A53. The method of any of paragraphs A1-A52, wherein the charge of composite material is a first charge of composite material, wherein the method includes repeating the operatively attaching a plurality of times to generate a plurality of composite-substrate assemblies that include a respective plurality of charges of composite material and a respective plurality of flexible substrates, and further wherein the method includes repeating the pressing and the releasing a plurality of times with the plurality of composite-substrate assemblies to retain the respective plurality of charges of composite material on the outer surface of the layup mandrel and define the skin for the composite structure.

A54. The method of any of paragraphs A1-A53, wherein, prior to the pressing, the method further includes locating a stiffening element within a stiffening element recess of the layup mandrel, wherein the pressing further includes pressing the charge of composite material against the stiffening element.

A55. The method of any of paragraphs A1-A54, wherein the operatively attaching is performed prior to at least one, and optionally both, of the pressing and the releasing.

A56. The method of any of paragraphs A1-A55, wherein the pressing is performed prior to the releasing.

A57. The method of any of paragraphs A1-A56, wherein the method further includes locating the composite-substrate assembly and the layup mandrel proximal to one another, near one another, or within a threshold distance of one another, optionally subsequent to the operatively attaching, and further optionally prior to the pressing.

A58. The method of paragraph A57, wherein the locating includes locating such that the charge of composite material is between the flexible substrate and the outer surface of the layup mandrel.

A59. The method of any of paragraphs A1-A58, wherein the method further includes curing the charge of composite material on the layup mandrel to generate the skin of the composite structure.

A60. The method of any of paragraphs A1-A59, wherein the method includes performing the method using the apparatus of any of paragraphs B1-B36.

B1. A composite structure manufacturing apparatus, comprising:
a flexible substrate that is configured to be operatively attached to a charge of composite material to form a composite-substrate assembly;
a layup mandrel that defines an outer surface that is configured to receive the charge of composite material; and
an assembly deformation structure that is configured to press the composite-substrate assembly against the outer surface of the layup mandrel to deform the composite-substrate assembly from an initial conformation to a final conformation that is different from the initial conformation.

B2. The apparatus of paragraph B1, wherein the flexible substrate is operatively attached to the charge of composite material.

B3. The apparatus of paragraph B2, wherein the apparatus further includes the composite-substrate assembly.

B4. The method of any of paragraphs B1-B3, wherein the apparatus further includes the charge of composite material.

B5. The apparatus of any of paragraphs B1-B4, wherein the flexible substrate defines a compaction vacuum manifold that is configured to apply a compaction vacuum between the flexible substrate and the outer surface of the layup mandrel to compact the charge of composite material on the outer surface of the layup mandrel when the composite-substrate assembly is operatively located on the layup mandrel.

B6. The apparatus of any of paragraphs B1-B5, wherein the assembly deformation structure is configured to deform the composite-substrate assembly such that the composite-substrate assembly defines a concave side and an opposed convex side.

B7. The apparatus of paragraph B6, wherein the charge of composite material is located on the concave side of the composite-substrate assembly.

B8. The apparatus of any of paragraphs B6-B7, wherein the flexible substrate is located on the convex side of the composite-substrate assembly.

B9. The apparatus of any of paragraphs B1-B8, wherein the apparatus includes a plurality of flexible substrates that are configured to be operatively attached to a plurality of respective charges of composite material to form a plurality of composite-substrate assemblies.

B10. The apparatus of paragraph B9, wherein the apparatus includes the plurality of composite-substrate assemblies.

B11. The apparatus of any of paragraphs B9-B10, wherein the apparatus further includes a staging structure that is configured to store the plurality of composite-substrate assemblies.

B12. The apparatus of any of paragraphs B9-B11, wherein the apparatus further includes a conveyance structure that is configured to convey the plurality of composite-substrate assemblies to the layup mandrel.

B13. The apparatus of any of paragraphs B1-B12, wherein the assembly deformation structure includes a tether that is configured to draw the composite-substrate assembly around the outer surface of the layup mandrel, optionally wherein the tether includes and/or is a strap.

B14. The apparatus of paragraph B13, wherein the assembly deformation structure further includes a support structure that is configured to support the tether.

B15. The apparatus of any of paragraphs B13-B14, wherein the tether is in contact with a side of the flexible substrate that is opposed to the charge of composite material.

B16. The apparatus of any of paragraphs B13-B15, wherein the flexible substrate defines a first edge and a second edge that is (substantially) opposed to the first edge, and further wherein the tether is attached to the first edge and to the second edge.

B17. The apparatus of any of paragraphs B13-B16, wherein the tether is further configured to be tightened around the composite-substrate assembly to draw the charge of composite material into contact with the outer surface of the layup mandrel when the composite-substrate assembly is operatively located on the layup mandrel.

B18. The apparatus of any of paragraphs B1-B17, wherein the assembly deformation structure includes a conveyance structure that is configured to orient the composite-substrate assembly relative to the layup mandrel.

B19. The apparatus of paragraph B18, wherein the conveyance structure is configured to locate the composite-substrate assembly vertically above the layup mandrel and to permit the composite-substrate assembly to drape across the outer surface of the layup mandrel under the influence of gravity.

B20. The apparatus of any of paragraphs B18-B19, wherein the conveyance structure includes a rotation structure that is configured to permit rotation of the composite-substrate assembly about a rotational axis.

B21. The apparatus of any of paragraphs B1-B20, wherein the assembly deformation structure includes a first support surface, which is configured to support a first portion of the composite-substrate assembly, and a second support surface, which is configured to support a second portion of the composite-substrate assembly, wherein the first support surface and the second support surface define a longitudinal opening therebetween, and further wherein an unsupported portion of the composite-substrate assembly extends across the longitudinal opening.

B22. The apparatus of paragraph B21, wherein the flexible substrate is located between the charge of composite material and the first support surface, and further wherein the flexible substrate is located between the charge of composite material and the second support surface.

B23. The apparatus of any of paragraphs B21-B22, wherein a longitudinal axis of the layup mandrel is (at least substantially) parallel to the longitudinal opening.

B24. The apparatus of any of paragraphs B21-B23, wherein the outer surface of the layup mandrel is in contact with the unsupported portion of the composite-substrate assembly.

B25. The apparatus of any of paragraphs B21-B24, wherein the assembly deformation structure further includes a translating mechanism that is configured to move the layup mandrel, the first support surface, and the second support surface relative to one another such that the layup mandrel contacts the charge of composite material and urges the charge of composite material into the longitudinal opening.

B26. The apparatus of paragraph B25, wherein the translating mechanism is further configured to move the first support surface and the second support surface away from one another to increase a width of the longitudinal opening while the charge of composite material is urged into the gap.

B27. The apparatus of any of paragraphs B1-B26, wherein the apparatus further includes an interfacial force control assembly that is configured to regulate an interfacial force that is applied between the charge of composite material and the flexible substrate to retain the charge of composite material on the flexible substrate.

B28. The apparatus of paragraph B27, wherein the interfacial force control assembly includes a retention vacuum assembly that is configured to apply a retention vacuum between the charge of composite material and the flexible substrate, optionally wherein the retention vacuum assembly includes a retention vacuum manifold that is defined by the flexible substrate.

B29. The apparatus of any of paragraphs B1-B28, wherein the apparatus further includes a locating assembly that is configured to align the composite-substrate assembly with the layup mandrel, optionally wherein the locating assembly includes at least one alignment pin that extends through the flexible substrate and into a respective alignment pin receptacle that is defined by the layup mandrel.

B30. The apparatus of any of paragraphs B1-B29, wherein the apparatus further includes a retention structure that is configured to retain the composite-substrate assembly on the outer surface of the layup mandrel, optionally wherein the retention structure includes a plurality of retention pins that extend through the flexible substrate and into a respective plurality of retention pin receptacles that are defined by the layup mandrel.

B31. The apparatus of any of paragraphs B1-B30, wherein the apparatus further includes a heating assembly that is configured to heat the composite-substrate assembly.

B32. The apparatus of any of paragraphs B1-B31, wherein the apparatus further includes a charge compaction assembly that is configured to compact the charge of composite material on the flexible substrate, optionally wherein the charge compaction assembly includes at least one of a vacuum bag and a vacuum chuck.

B33. The apparatus of any of paragraphs B1-B32, wherein the apparatus further includes a skin compaction assembly that is configured to compact the charge of composite material on the outer surface of the layup mandrel.

B34. The apparatus of paragraph B33, wherein the skin compaction assembly is configured to apply a compaction vacuum between the flexible substrate and the outer surface of the layup mandrel to compact the charge of composite material on the outer surface of the layup mandrel.

B35. The apparatus of paragraph B34, wherein the skin compaction assembly includes a compaction vacuum manifold that is defined by the flexible substrate and is configured to provide the compaction vacuum.

B36. The apparatus of paragraph B35, wherein the skin compaction assembly further includes a compaction vacuum source that is in fluid communication with the compaction vacuum manifold.

C1. The method of any of paragraphs A1-A60 or the apparatus of any of paragraphs B1-B36, wherein the charge of composite material includes a plurality of fibers in a resin material, optionally wherein the plurality of fibers includes at least one of a plurality of carbon fibers, a plurality of polymeric fibers, and a plurality of glass fibers, and further optionally wherein the resin material includes at least one of an epoxy, an adhesive, and a polymeric resin.

C2. The method of any of paragraphs A1-A60 or C1 or the apparatus of any of paragraphs B1-C1, wherein the charge of composite material includes a pre-impregnated composite material, and optionally a pre-impregnated composite tape.

C3. The method of any of paragraphs A1-A60 or C1-C2 or the apparatus of any of paragraphs B1-C2, wherein the flexible substrate is formed from at least one of a polymeric material, a plastic, a polycarbonate, a polyester, a metal, and aluminum.

C4. The method of any of paragraphs A1-A60 or C1-C3 or the apparatus of any of paragraphs B1-C3, wherein the flexible substrate is solid and substantially free of voids.

C5. The method of any of paragraphs A1-A60 or C1-C4 or the apparatus of any of paragraphs B1-C4, wherein the flexible substrate defines one or more voids therein.

C6. The method of any of paragraphs A1-A60 or C1-C5 or the apparatus of any of paragraphs B1-C5, wherein the flexible substrate is defined by a first planar wall, a second planar wall, and a plurality of elongate webs that extend between the first planar wall and the second planar wall, optionally wherein the first planar wall, the second planar wall, and the plurality of elongate webs define a plurality of elongate channels, optionally wherein the flexible substrate is a panel, and further optionally wherein the flexible substrate is a double-walled panel.

C7. The method of any of paragraphs A1-A60 or C1-C6 or the apparatus of any of paragraphs B1-C6, wherein a sealing structure is operatively attached to the flexible substrate and extends around a periphery of the charge of composite material when the charge of composite material is operatively attached to the flexible substrate, wherein the sealing structure is configured to form a fluid seal between the flexible substrate and the outer surface of the layup mandrel when the composite-substrate assembly is operatively located on the layup mandrel.

C8. The method of any of paragraphs A1-A60 or C1-C7 or the apparatus of any of paragraphs B1-C7, wherein the outer surface of the layup mandrel defines a contour of an inner surface of at least one of an aircraft, a portion of an aircraft, an airframe, a portion of an airframe, a fuselage, a portion of a fuselage, a fuselage barrel, a portion of a fuselage barrel, a wing, a portion of a wing, an elevator, a portion of an elevator, a rudder, a portion of a rudder, a flap, a portion of a flap, an engine nacelle, a portion of an engine nacelle, an engine cowl, a portion of an engine cowl, a stabilizer, and a portion of a stabilizer.

C9. The method of any of paragraphs A1-A60 or C1-C8 or the apparatus of any of paragraphs B1-C8, wherein the composite structure includes at least one of an aircraft, a portion of an aircraft, an airframe, a portion of an airframe, a fuselage, a portion of a fuselage, a fuselage barrel, a portion of a fuselage barrel, a wing, a portion of a wing, an elevator, a portion of an elevator, a rudder, a portion of a rudder, a flap, a portion of a flap, an engine nacelle, a portion of an engine nacelle, an engine cowl, a portion of an engine cowl, a stabilizer, and a portion of a stabilizer.

C10. The method of any of paragraphs A1-A60 or C1-C9 or the apparatus of any of paragraphs B1-C9, wherein the initial conformation includes a planar, or at least substantially planar, conformation.

C11. The method of any of paragraphs A1-A60 or C1-C10 or the apparatus of any of paragraphs B1-C10, wherein the initial conformation includes at least one of a non-planar conformation and an arcuate conformation.

C12. The method of any of paragraphs A1-A60 or C1-C11 or the apparatus of any of paragraphs B1-C11, wherein the final conformation defines at least one of a non-planar conformation and an arcuate conformation.

C13. The method of any of paragraphs A1-A60 or C1-C12 or the apparatus of any of paragraphs B1-C12, wherein the final conformation corresponds to a surface profile of the outer surface of the layup mandrel.

C14. The method of any of paragraphs A1-A60 or C1-C13 or the apparatus of any of paragraphs B1-C13, wherein a radius of curvature that is defined by the final conformation is less than a radius of curvature that is defined by the initial conformation.

C15. The method of any of paragraphs A1-A60 or C1-C14 or the apparatus of any of paragraphs B1-C14, wherein the outer surface of the layup mandrel is defined by the layup mandrel.

C16. The method of any of paragraphs A1-A60 or C1-C14 or the apparatus of any of paragraphs B1-C14, wherein an intermediate structure is located between the charge of composite material and the layup mandrel, and further wherein the outer surface of the layup mandrel is defined by the intermediate structure.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method.

Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of assembling a skin of a composite structure on an outer surface of a layup mandrel, the method comprising:
    operatively attaching a charge of composite material to a flexible substrate to define an initial conformation for a composite-substrate assembly that includes the charge of composite material and the flexible substrate;
    locating the composite-substrate assembly and the layup mandrel proximal to one another;
    supporting a first portion of the composite-substrate assembly with a first support surface and supporting a second portion of the composite-substrate assembly with a second support surface, wherein the first support surface and the second support surface define a longitudinal opening therebetween;
    pressing the composite-substrate assembly against the outer surface of the layup mandrel to deform the composite-substrate assembly to a final conformation that is different from the initial conformation, wherein the supporting of the first portion and the supporting of the second portion occur prior to the pressing, and further wherein the pressing includes moving the layup mandrel, the first support surface, and the second support surface relative to one another such that the outer surface of the layup mandrel contacts the charge of composite material and urges the charge of composite material into the longitudinal opening;
    affixing the charge of composite material to the outer surface of the layup mandrel; and
    releasing the charge of composite material from the flexible substrate while retaining the charge of composite material on the outer surface of the layup mandrel.

2. The method of claim 1, wherein the operatively attaching includes applying a retention vacuum between the charge of composite material and the flexible substrate with a retention vacuum manifold that is defined by the flexible substrate.

3. The method of claim 2, wherein the method further includes maintaining the retention vacuum during the pressing to retain the charge of composite material on the flexible substrate.

4. The method of claim 2, wherein the method further includes regulating a magnitude of the retention vacuum during the pressing to control a relative motion between the charge of composite material and the flexible substrate during the pressing.

5. The method of claim 1, wherein the pressing includes applying a first deformation force to the flexible substrate and simultaneously applying a second deformation force to the charge of composite material to compress the charge of composite material between the flexible substrate and the outer surface of the layup mandrel.

6. The method of claim 5, wherein the second deformation force is directed away from the outer surface of the layup mandrel, and further wherein the second deformation force is applied by the outer surface of the layup mandrel.

7. The method of claim 1, wherein the pressing includes conforming the composite-substrate assembly to at least one of (i) the outer surface of the layup mandrel and (ii) a contour of the outer surface of the layup mandrel.

8. The method of claim 1, wherein the pressing includes extending a piston, wherein the extending further includes receiving the piston within a respective indexing recess that is defined by the layup mandrel to align the charge of composite material with the outer surface of the layup mandrel.

9. The method of claim 1, wherein the pressing includes applying a deformation force to an edge of the composite-substrate assembly to urge the edge of the composite-substrate assembly toward the outer surface of the layup mandrel.

10. The method of claim 1, wherein the pressing includes moving the first support surface and the second support surface away from one another to increase a width of the longitudinal opening.

11. The method of claim 1, wherein the releasing includes ceasing a retention vacuum between the charge of composite material and the flexible substrate.

12. The method of claim 1, wherein, prior to the releasing, the method further includes compacting the charge of composite material on the outer surface of the layup mandrel, wherein the compacting the charge of composite material on the outer surface of the layup mandrel includes applying a compaction vacuum between the flexible substrate and the outer surface of the layup mandrel with a compaction vacuum manifold that is defined by the flexible substrate.

13. The method of claim 1, wherein the charge of composite material is a first charge of composite material, wherein the method includes repeating the operatively attaching a plurality of times to generate a plurality of composite-substrate assemblies that include a respective plurality of charges of composite material and a respective plurality of flexible substrates, and further wherein the method includes repeating the pressing and the releasing a plurality of times with the plurality of composite-substrate assemblies to retain the respective plurality of charges of composite material on the outer surface of the layup mandrel and define the skin for the composite structure.

14. A method of assembling a skin of a composite structure on an outer surface of a layup mandrel, the method comprising:
    operatively attaching a charge of composite material to a flexible substrate to define an initial conformation for a composite-substrate assembly that includes the charge of composite material and the flexible substrate;
    locating the composite-substrate assembly and the layup mandrel proximal to one another;
    supporting a first portion of the composite-substrate assembly with a first support surface and supporting a second portion of the composite-substrate assembly with a second support surface, wherein the first support surface and the second support surface define a longitudinal opening therebetween, wherein the locating includes contacting the outer surface of the layup mandrel with a portion of the composite-substrate assembly that extends across the longitudinal opening;
    pressing the composite-substrate assembly against the outer surface of the layup mandrel to deform the composite-substrate assembly to a final conformation that is different from the initial conformation, wherein the supporting of the first portion and the supporting of the second portion occur prior to the pressing, and further wherein the pressing includes moving the layup mandrel, the first support surface, and the second support surface relative to one another such that the layup mandrel is located within the longitudinal opening;

affixing the charge of composite material to the outer surface of the layup mandrel; and releasing the charge of composite material from the flexible substrate while retaining the charge of composite material on the outer surface of the layup mandrel.

15. The method of claim 14, wherein the charge of composite material is a first charge of composite material, wherein the method includes repeating the operatively attaching a plurality of times to generate a plurality of composite-substrate assemblies that include a respective plurality of charges of composite material and a respective plurality of flexible substrates, and further wherein the method includes repeating the pressing and the releasing a plurality of times with the plurality of composite-substrate assemblies to retain the respective plurality of charges of composite material on the outer surface of the layup mandrel and define the skin for the composite structure.

16. The method of claim 14, wherein the pressing includes conforming the composite-substrate assembly to at least one of (i) the outer surface of the layup mandrel and (ii) a contour of the outer surface of the layup mandrel.

17. The method of claim 14, wherein the pressing includes moving the first support surface and the second support surface away from one another to increase a width of the longitudinal opening.

18. A method of assembling a skin of a composite structure on an outer surface of a layup mandrel, the method comprising:

operatively attaching a charge of composite material to a flexible substrate to define an initial conformation for a composite-substrate assembly that includes the charge of composite material and the flexible substrate;

locating the composite-substrate assembly and the layup mandrel proximal to one another;

supporting a first portion of the composite-substrate assembly with a first support surface and supporting a second portion of the composite-substrate assembly with a second support surface, wherein the first support surface and the second support surface define a longitudinal opening therebetween;

pressing the composite-substrate assembly against the outer surface of the layup mandrel to deform the composite-substrate assembly to a final conformation that is different from the initial conformation, wherein the supporting of the first portion and the supporting of the second portion occur prior to the pressing, and further wherein the pressing includes moving the first support surface and the second support surface away from one another to increase a width of the longitudinal opening;

affixing the charge of composite material to the outer surface of the layup mandrel; and releasing the charge of composite material from the flexible substrate while retaining the charge of composite material on the outer surface of the layup mandrel.

19. The method of claim 18, wherein the charge of composite material is a first charge of composite material, wherein the method includes repeating the operatively attaching a plurality of times to generate a plurality of composite-substrate assemblies that include a respective plurality of charges of composite material and a respective plurality of flexible substrates, and further wherein the method includes repeating the pressing and the releasing a plurality of times with the plurality of composite-substrate assemblies to retain the respective plurality of charges of composite material on the outer surface of the layup mandrel and define the skin for the composite structure.

20. The method of claim 18, wherein the pressing includes conforming the composite-substrate assembly to at least one of (i) the outer surface of the layup mandrel and (ii) a contour of the outer surface of the layup mandrel.

\* \* \* \* \*